(12) United States Patent  (10) Patent No.: US 8,959,838 B1
Marinelli  (45) Date of Patent: Feb. 24, 2015

(54) CARGO VEHICLE SECURITY SYSTEM AND METHOD OF USE

(71) Applicant: Vittorio Marinelli, Deerfield Beach, FL (US)

(72) Inventor: Vittorio Marinelli, Deerfield Beach, FL (US)

( * ) Notice: Subject to any disclaimer, the term of this patent is extended or adjusted under 35 U.S.C. 154(b) by 0 days.

(21) Appl. No.: 13/894,376

(22) Filed: May 14, 2013

Related U.S. Application Data

(63) Continuation-in-part of application No. 12/972,469, filed on Dec. 18, 2010, now Pat. No. 8,438,784.

(60) Provisional application No. 61/288,279, filed on Dec. 19, 2009.

(51) Int. Cl.
  *E05B 77/12* (2014.01)
  *B60J 5/12* (2006.01)

(52) U.S. Cl.
  CPC ... *E05B 77/12* (2013.01); *B60J 5/12* (2013.01)
  USPC .............................................. 49/449; 292/137

(58) Field of Classification Search
  CPC .................................. E05B 77/06; E05B 77/12
  USPC ............ 49/141, 449; 292/137, 138, 144, 150, 292/163, DIG. 22; 160/201
  See application file for complete search history.

(56) References Cited

U.S. PATENT DOCUMENTS

| | | | |
|---|---|---|---|
| 2,097,950 A | 11/1937 | Johnson | |
| 2,327,778 A | 8/1943 | Wolf et al. | |
| 2,577,348 A | 12/1951 | McLaughlin | |
| 2,703,235 A | 3/1955 | Reamey | |
| 2,982,541 A | 5/1961 | Brady | |
| 3,130,590 A * | 4/1964 | Schleicher | 74/2 |
| 3,177,022 A | 4/1965 | McKee et al. | |
| 3,396,999 A | 8/1968 | Knapp | |
| 3,453,015 A * | 7/1969 | Miller | 292/186 |
| 3,543,441 A | 12/1970 | La Porte | |
| 3,708,917 A | 1/1973 | Streeter | |
| 3,933,382 A | 1/1976 | Counts et al. | |
| 3,934,635 A | 1/1976 | Kin | |
| 3,955,661 A | 5/1976 | Popper et al. | |
| 3,990,531 A * | 11/1976 | Register | 180/281 |
| 4,160,509 A | 7/1979 | Switzer | |
| 4,254,582 A | 3/1981 | McGee | |
| 4,263,795 A | 4/1981 | Van Gompel | |
| 4,372,419 A | 2/1983 | Barnett et al. | |
| 4,414,778 A | 11/1983 | Carli | |
| 4,461,160 A | 7/1984 | Van Gompel | |
| 4,536,021 A * | 8/1985 | Mochida | 292/201 |
| 4,597,428 A | 7/1986 | Iha | |
| 4,615,558 A | 10/1986 | Nakamura et al. | |
| 4,702,095 A | 10/1987 | Ben-Asher | |
| 4,739,584 A | 4/1988 | Zellman | |
| 4,782,674 A | 11/1988 | Johnson | |
| 4,821,456 A | 4/1989 | Nogaki | |

(Continued)

*Primary Examiner* — Katherine Mitchell
*Assistant Examiner* — Justin Rephann
(74) *Attorney, Agent, or Firm* — Allen D. Hertz, P.A.; Allen D. Hertz

(57) ABSTRACT

A vehicle door security system comprising at least one deadbolt and respective operational elements, wherein the deadbolt secures at least one of a pivoting door and a roll up cargo door. The deadbolt toggles between an engaging configuration and a released configuration. The deadbolt can include an inertial release mechanism that disengages the deadbolt from the engaging configuration when the vehicle is subjected to a sudden impact. Alternatively, the deadbolt can be opened using a manual release mechanism located externally from the vehicle.

19 Claims, 21 Drawing Sheets

(56) References Cited

U.S. PATENT DOCUMENTS

| | | | |
|---|---|---|---|
| 4,830,415 A | 5/1989 | Nelson | |
| 4,860,813 A | 8/1989 | Ballyns et al. | |
| 4,866,963 A | 9/1989 | Leininger et al. | |
| 4,884,831 A | 12/1989 | Emon | |
| 4,891,908 A | 1/1990 | Aquilina | |
| 4,905,542 A | 3/1990 | Burm et al. | |
| 5,001,861 A | 3/1991 | Hahn | |
| 5,056,847 A | 10/1991 | Stillwell et al. | |
| 5,080,409 A | 1/1992 | Niswonger | |
| 5,152,562 A * | 10/1992 | Stevenson et al. | 292/252 |
| 5,168,914 A | 12/1992 | Keller | |
| 5,188,163 A | 2/1993 | Schwartzengraber et al. | |
| 5,239,776 A | 8/1993 | Lhotak | |
| 5,263,347 A | 11/1993 | Allbaugh et al. | |
| 5,280,881 A | 1/1994 | Karmin | |
| 5,343,923 A | 9/1994 | Keller | |
| 5,386,713 A * | 2/1995 | Wilson | 70/280 |
| 5,429,170 A | 7/1995 | Nogaki | |
| 5,509,233 A | 4/1996 | Peterson | |
| 5,532,521 A | 7/1996 | Leininger | |
| 5,533,561 A | 7/1996 | Forehand, IV | |
| 5,537,848 A | 7/1996 | Grzanka et al. | |
| 5,544,691 A | 8/1996 | Wandio | |
| 5,593,191 A | 1/1997 | DeMarco | |
| 5,640,139 A | 6/1997 | Egeberg | |
| 5,664,372 A | 9/1997 | Williams et al. | |
| 5,673,948 A | 10/1997 | Karpisek | |
| 5,685,578 A * | 11/1997 | Schneider | 292/144 |
| 5,690,371 A * | 11/1997 | Turnbull | 292/163 |
| 5,693,987 A | 12/1997 | Krucoff | |
| 5,715,712 A | 2/1998 | West | |
| 5,720,333 A | 2/1998 | Turvey | |
| 5,738,161 A | 4/1998 | Martin | |
| 5,755,126 A | 5/1998 | Lanigan et al. | |
| 5,769,471 A * | 6/1998 | Suzuki et al. | 292/336.3 |
| 5,791,179 A | 8/1998 | Brask | |
| 5,799,516 A * | 9/1998 | Zintler | 70/92 |
| 5,803,149 A | 9/1998 | Halley et al. | |
| 5,894,906 A * | 4/1999 | Weber | 180/274 |
| 5,941,578 A | 8/1999 | Shamblin | |
| 5,943,888 A | 8/1999 | Lawson | |
| 6,030,019 A | 2/2000 | Stiltner et al. | |
| 6,041,845 A | 3/2000 | Couch | |
| 6,049,448 A | 4/2000 | Lanigan et al. | |
| 6,070,361 A | 6/2000 | Paterno | |
| 6,105,312 A | 8/2000 | Lucas | |
| 6,145,570 A | 11/2000 | Mullet et al. | |
| 6,179,036 B1 | 1/2001 | Harvey | |
| 6,273,174 B1 | 8/2001 | Singleton | |
| 6,276,744 B1 | 8/2001 | Huber et al. | |
| 6,463,989 B1 | 10/2002 | Johnson | |
| 6,554,326 B1 | 4/2003 | Goldman | |
| 6,588,483 B2 | 7/2003 | Rosenberg | |
| 6,605,910 B2 | 8/2003 | Mullet et al. | |
| 6,698,263 B2 | 3/2004 | Hsieh | |
| 6,742,564 B2 | 6/2004 | Martin | |
| 6,834,464 B2 | 12/2004 | Shoemaker | |
| 6,851,290 B1 | 2/2005 | Meier et al. | |
| 6,983,962 B2 | 1/2006 | Keightley | |
| 7,040,675 B1 | 5/2006 | Ott et al. | |
| 7,064,456 B2 * | 6/2006 | Hirota et al. | 307/10.1 |
| 7,076,917 B2 | 7/2006 | Chang | |
| 7,111,895 B2 | 9/2006 | Rivers et al. | |
| 7,114,753 B2 | 10/2006 | Nodorft | |
| 7,316,141 B2 | 1/2008 | Goldman | |
| 7,350,836 B2 | 4/2008 | Simpson | |
| 7,481,468 B2 * | 1/2009 | Merideth et al. | 292/137 |
| 2002/0053411 A1 | 5/2002 | Mochizuki | |
| 2004/0026999 A1 * | 2/2004 | Hirota et al. | 307/10.1 |
| 2004/0140065 A1 | 7/2004 | Hartmann | |
| 2004/0256064 A1 | 12/2004 | Bennett et al. | |
| 2005/0073173 A1 | 4/2005 | Belanger et al. | |
| 2005/0120629 A1 | 6/2005 | Chang | |
| 2005/0126720 A1 | 6/2005 | Rekret | |
| 2006/0027343 A1 | 2/2006 | Bennett et al. | |
| 2006/0261603 A1 * | 11/2006 | Cetnar et al. | 292/216 |
| 2007/0085349 A1 * | 4/2007 | Merideth et al. | 292/183 |
| 2008/0104889 A1 | 5/2008 | Chang | |
| 2008/0111381 A1 * | 5/2008 | Merideth et al. | 292/137 |
| 2009/0044454 A1 | 2/2009 | Meichtry | |
| 2010/0283268 A1 * | 11/2010 | Cumbo | 292/196 |

* cited by examiner

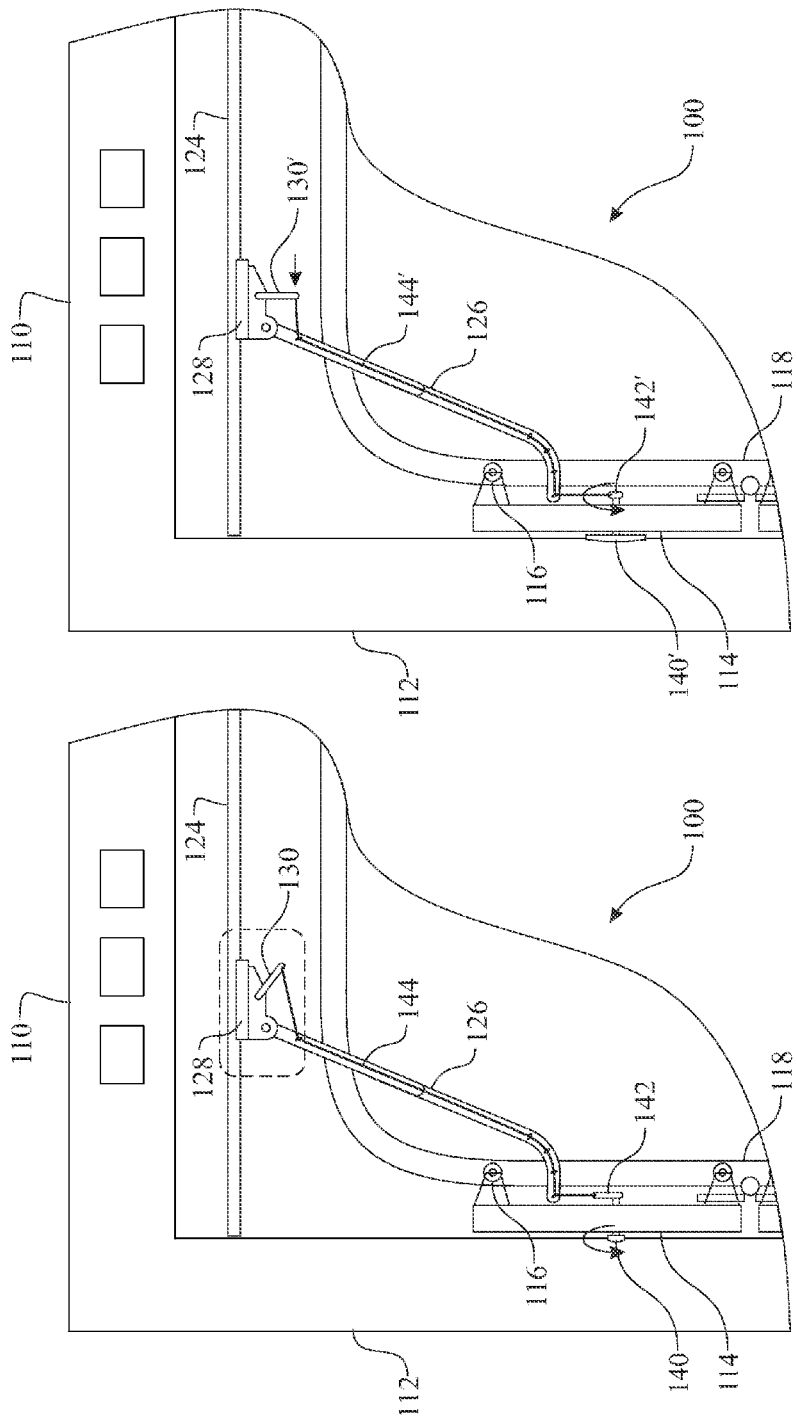

CARGO VEHICLE SECURITY SYSTEM AND METHOD OF USE

CROSS-REFERENCE TO RELATED APPLICATION

This application is a Continuation-In-Part Patent Application claiming the benefit of United States Non-Provisional patent application Ser. No. 12/972,469, filed on Dec. 18, 2009 (Issuing as U.S. Pat. No. 8,438,784), which claims priority to U.S. Provisional Patent Application Ser. No. 61/288,279, filed on Dec. 19, 2009, which is incorporated herein in its entirety.

FIELD OF THE INVENTION

The present invention relates to a vehicle security system, and more particularly, a door management system comprising a deadbolt door locking system and a roll up door automated door mechanism, each comprising an external emergency release allowing release of the lock should a failure occur in either mechanism.

BACKGROUND OF THE INVENTION

The invention pertains to a cargo vehicle security system comprising a deadbolt door locking system for each of a single door and a double door. The cargo vehicle security system further comprising an automated door opening system for opening a roll up door.

An overhead door opening system for use in conjunction with a roll up cargo door is known. The implementation has a variety of configurations. Each of the systems are limited should the overhead door opening system fail. The configuration of most cargo vehicles provides a single access to the cargo area, that being the roll up cargo door. Should the overhead door opening system fail, the system locks the user from accessing the cargo area.

The overhead door opening system allows the door to move vertically while the vehicle is traveling and passes across bumps or other vibration introducing features along the path of travel. The play in the overhead door opening system allows the cargo door to jump up and down, allowing smaller items to slide under the door, cause potential damage to the door or door opening system, and the like. The noise can be distracting to the driver or other occupants of the vehicle.

Several door locking deadbolt systems are known. Each of the deadbolt configurations secures the door to a vehicle frame member. The deadbolt and actuator can be secured to the door, with the deadbolt pin being moveably configured to engage with the frame member. Alternately, the deadbolt and actuator can be secured to the frame member, with the deadbolt pin being moveably configured to engage with the vehicle door. Should the locking system fail, leaving the deadbolt engaged and the door locked in a closed position. A failure would keep a driver from accessing the interior of the vehicle. A failure during an accident would keep rescue workers from accessing the occupants of the vehicle via the doors.

Accordingly, there remains a need in the art for a device that secures a vehicle, while allowing access to the secured compartments should the securing system fail.

SUMMARY OF THE INVENTION

The present invention overcomes the deficiencies of the known art and the problems that remain unsolved by providing a method and respective apparatus for securing a cargo vehicle.

In accordance with one embodiment of the present invention, the invention consists of a cargo roll up door opening system, the system comprising:
  a roll up cargo door providing access to a cargo enclosed area;
  an overhead door opening system comprising:
    a drive motor,
    a linear motion controlling mechanism;
    a disengaging linkage providing a removably engaging coupling between the roll up cargo door and the linear motion controlling mechanism; and
  a release mechanism operationally located external to the cargo enclosed area and engaging with the disengaging linkage wherein the user can operate the release mechanism from outside the cargo enclosed area causing the disengaging linkage to disengage the coupling between the roll up cargo door and the linear motion controlling mechanism.

In one aspect, the release mechanism is a rotatable handle located on an exterior of the roll up cargo door.

In another aspect, the release mechanism utilizes a cable between an external operable element and the disengaging linkage.

In yet another aspect, the release mechanism utilizes a linkage between an external operable element and the disengaging linkage.

In yet another aspect, the linkage provided between the roll up cargo door and the linear motion controlling mechanism includes a limited sliding interface allowing the linear motion controlling mechanism to move a predetermined distance before engaging to move the roll up cargo door.

In yet another aspect, the limited sliding interface operates a door securing deadbolt interface.

In yet another aspect, an actuator operates a door securing deadbolt interface engaging a deadbolt at a location to limit the vertical motion of the roll up cargo door by positioning the deadbolt to interfere with a motion of the wheel along the track.

In accordance with a second embodiment of the present invention, the invention consisting of:
  a deadbolt actuating assembly having a deadbolt sliding mechanism for securing a door in a closed position against a doorframe; and
  a mechanical safety release mechanism operationally located external to an enclosed area accessed via the door, wherein said mechanical safety release mechanism engages with the deadbolt sliding mechanism wherein the user can operate the mechanical safety release mechanism from outside the enclosed area causing the deadbolt sliding mechanism to disengage the coupling between the door and the doorframe.

In yet another aspect, the mechanical safety release mechanism utilizes a cable between a release aiding member and the deadbolt sliding mechanism.

In yet another aspect, the mechanical safety release mechanism utilizes a mechanical linkage between a release aiding member and the deadbolt sliding mechanism.

In yet another aspect, the mechanical safety release mechanism further incorporates an inertial release activating mechanism wherein the inertial release activating mechanism ensures the deadbolt sliding mechanism is positioned in a disengaged configuration.

In yet another aspect, a safety release mechanism is integrated with an airbag activation sensor.

While another aspect utilizes a weight positioned within a containment member allowing for a horizontal plane motion of freedom.

In accordance with a third embodiment of the present invention, the invention consisting of:

an inertial safety releasing vehicle deadbolt assembly comprising:

a deadbolt housing having a deadbolt registration member located at a base end of the housing, the deadbolt registration member comprising a deadbolt registration member aperture passing therethrough, an inertial safety releasing deadbolt comprising an elongated body having an actuating deadbolt end located at a first end of the body and a tapered or conically shaped engaging end formed at a second, opposite end of the body, a retention member comprising a deadbolt retention surface located to engage with the actuating deadbolt end, an operational control subassembly comprising features to re-engage the actuating deadbolt end against the deadbolt retention surface after disengagement therebetween, wherein, in use, the deadbolt housing is affixed to a first member of a vehicle enabling the deadbolt to alternate between an engaging configuration and a disengaging configuration, in the engaging configuration, the actuating deadbolt end is positioned in communication with the deadbolt retention surface and the deadbolt engaging end is inserted through the deadbolt registration member aperture and engaging with a doorframe deadbolt engaging feature, and in the disengaging configuration, the actuating deadbolt end is separated from the deadbolt retention surface and the deadbolt engaging end is separated from the doorframe deadbolt engaging feature.

In another aspect of the third embodiment, the vehicle can be secured using inertial releasing deadbolt assemblies. Each inertial releasing deadbolt assembly includes an inertial release mechanism. The inertial release mechanism releases the deadbolt from an engaging configuration. The inertial release mechanism is provided to disengage the deadbolt when the vehicle is involved in an accident.

In yet another aspect, the deadbolt retention surface, the deadbolt registration member aperture and the doorframe deadbolt engaging feature are arranged in linear alignment with one another.

In yet another aspect, the deadbolt registration member aperture is formed having an inverted frustum shape. The inverted frustum shape enables an angular motion of the deadbolt body, wherein the angular motion separates the actuating deadbolt end from the deadbolt retention surface.

In yet another aspect, the deadbolt can be disengaged when one or more airbags are deployed.

In yet another aspect, the inertial release mechanism utilizes a weighted object to disengage the deadbolt from a locked, retention configuration.

In yet another aspect, the inertial release mechanism is activated when the vehicle is subjected to a sudden change in motion, such as being involved in an accident. The inertial release mechanism is not activated during normal changes in acceleration, including acceleration and de-acceleration or braking.

In yet another aspect, the weighted object is assembled to the inertial releasing deadbolt assembly using a conically shaped support element.

In yet another aspect, the deadbolt is retained in an engaging configuration by a retention element. The retention element engages with an actuating end of the deadbolt. A biasing element retains the actuating deadbolt end in communication with a deadbolt retention surface of the retention element.

In yet another aspect, the inertial releasing deadbolt assembly includes an operator directed release subassembly. The operator directed release subassembly releases the deadbolt from the engaging configuration. In one embodiment, the an operator directed release subassembly includes an operational release pin which separates the actuating deadbolt end from the deadbolt retention surface causing the deadbolt engaging end to become separated from the doorframe deadbolt engaging feature.

In yet another aspect, the deadbolt can be disengaged when one or more airbags are deployed.

In yet another aspect, the deadbolt can be reset using an operational control subassembly. The operational control subassembly can include a conically shaped surface used to direct the actuating deadbolt end to engage with the deadbolt retention surface of the retention element.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 3 presents a side, elevation view of an exterior release mechanism in communication with a disengaging linkage of the automated overhead door opening system, shown in an engaged configuration;

FIG. 4 presents a side, elevation view of the exterior release mechanism in communication with the disengaging linkage of the automated overhead door opening system, shown in a disengaged configuration;

Like reference numerals refer to like parts throughout the several views of the drawings.

DETAILED DESCRIPTION OF THE PRESENT INVENTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
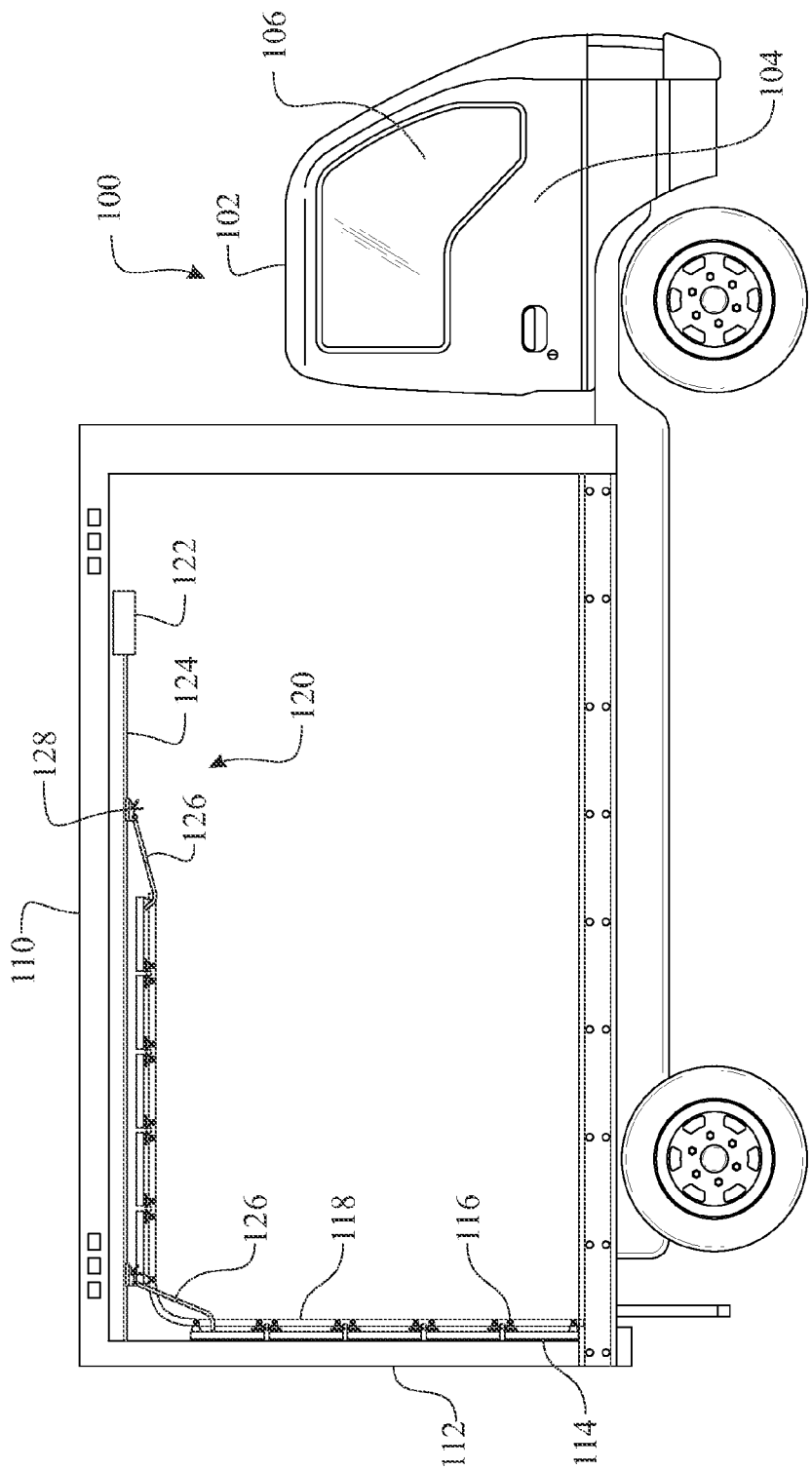
FIG. 1 presents a side, elevation view of an automated overhead door opening system integrated into a trailer portion of a cargo vehicle.

For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention integrates an automated door opening assembly 120 into a cargo vehicle 100. The cargo vehicle 100 includes commonly known features, such as a vehicle cab 102 and a cargo trailer 110 as presented in the exemplary illustration of FIGS. 1 and 2. The vehicle cab 102 is accessible via a vehicle door 104. A door window 106 is integrated into the vehicle door 104 providing visibility for the occupants. Contrarily, the door window 106 provides an easy access point for a criminal to obtain unauthorized entry into the vehicle cab 102. The cargo trailer 110 is accessible via a trailer access door 112; the trailer access door 112 commonly being a roll up door comprising a plurality of trailer roll up door panels 114. The plurality of trailer roll up door panels 114 is assembled via a series of door panel hinges 115. The trailer access door 112 comprises a series of door wheels 116 engaged in a roll up door track 118. The automated door opening assembly 120 maintains the trailer access door 112 at a fixed position, preferably either closed (as shown) or open (as understood). The automated door opening assembly 120 comprises an automated opener or drive motor 122 in communication with an opener track and drive assembly 124 (the drive assembly may alternately be referred to as a linear motion control assembly) for moveably positioning a linkage arm to door opening carriage or track engaging assembly 128. The drive assembly can be a screw drive, a chain drive, a cable drive, and the like, including the interface provided between the opener motor 122 and a linear motion means. An opener linkage arm 126 extends between and couples the linkage arm to track engaging assembly 128 and the trailer access door 112 for opening/closing the trailer access door 112, as well as maintaining the trailer access door 112 at a position. The automated opener motor 122 drives the opener track and drive assembly 124. The linkage arm to track engaging assembly 128 is engaged with the drive components of the opener track and drive assembly 124. The linkage arm to track engaging assembly 128 is connected to the trailer access door 112 via the opener linkage arm 126. The automated opener motor 122 operates and moves the drive components of the opener track and drive assembly 124, which drives the position of the linkage arm to track engaging assembly 128. The resulting motion opens or closes the trailer access door 112 accordingly. When the automated door opening assembly 120 is not in operation, the automated opener motor 122 remains stationary, thus maintaining the trailer access door 112 in position. The opener track and drive assembly 124 can utilize a chain drive, a cable dive, a screw drive, and the like. The automated opener motor 122 can operate via AC or DC current. The preferred embodiment utilizes DC current, thus avoiding the need for an inverter.

Figure 2:
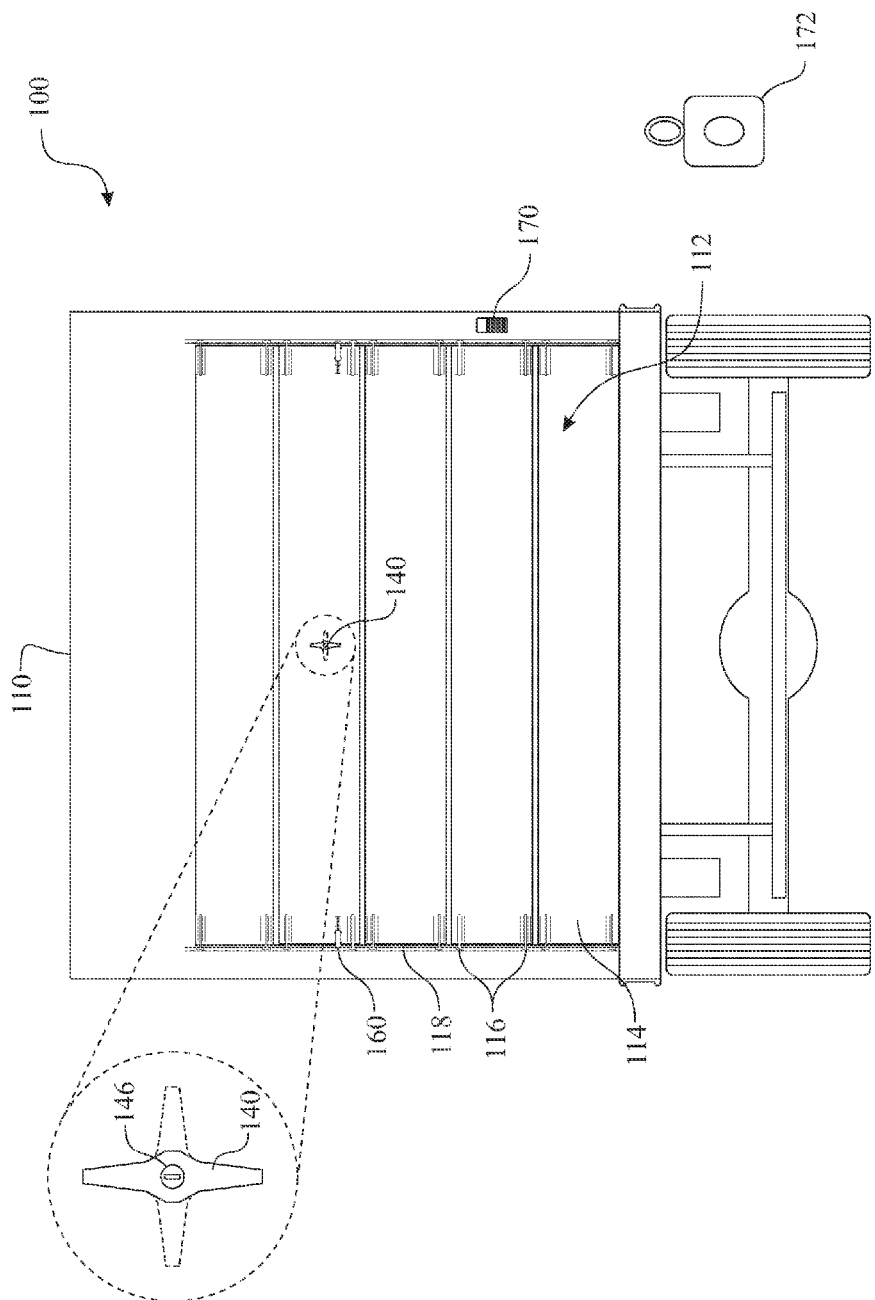
FIG. 2 presents a rear, elevation view of the trailer portion of a cargo vehicle of FIG. 1.
Figure 6:
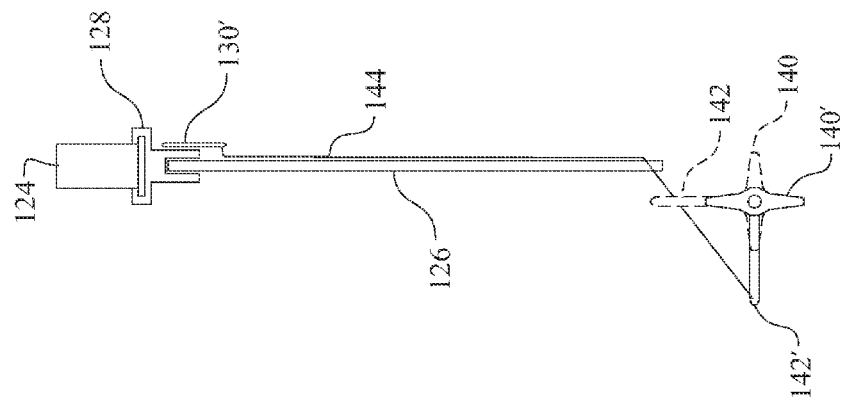
FIG. 6 presents a rear, elevation view of the exterior release mechanism in communication with the disengaging linkage of the automated overhead door opening system, shown in a disengaged configuration.
Figure 5:
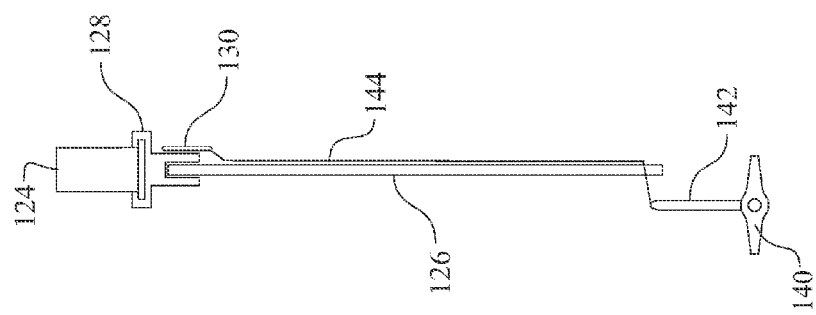
FIG. 5 presents a rear, elevation view of an exterior release mechanism in communication with a disengaging linkage of the automated overhead door opening system, shown in an engaged configuration.
Figure 7:
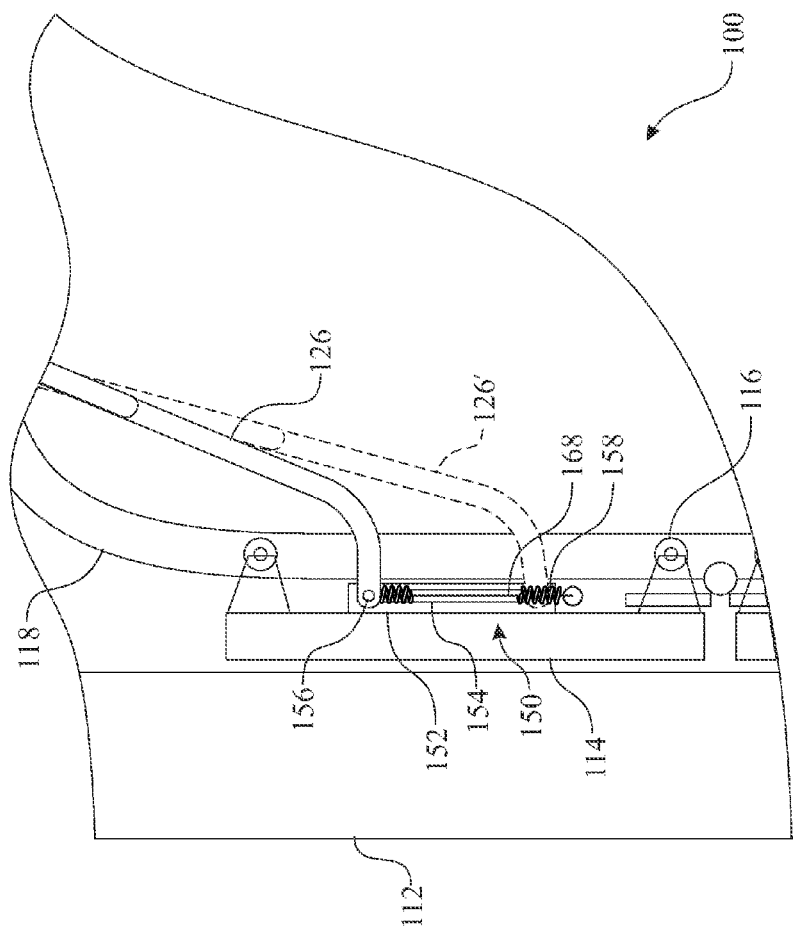
FIG. 7 presents a side, elevation view of a linkage arm and linkage bracket comprising a slideable engaging interface.
Figure 8:
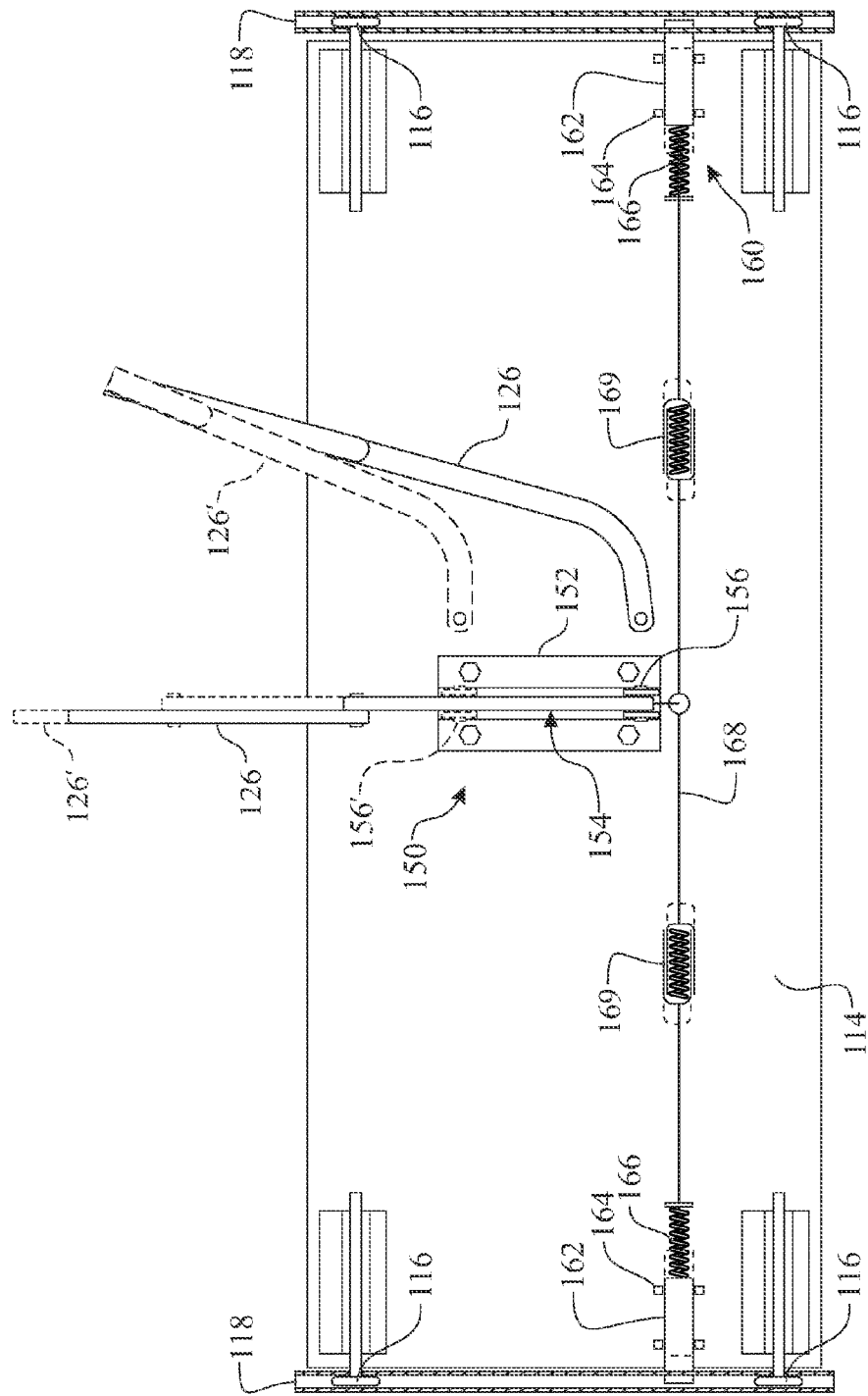
FIG. 8 presents a front, elevation view of a linkage arm and linkage bracket comprising a slideable engaging interface of FIG. 8.

The trailer access door 112 is generally an assembly comprising a plurality of trailer roll-up door panels 114, as best illustrated in FIG. 2. Each of the trailer roll up door panel 114 utilizes a pair of door wheels 116 located on each of the outer edges of the trailer roll up door panel 114, preferably proximate the corners. A keypad remote 170 or a remote operation transmitter 172 can be used for operating the automated door opening assembly 120. The user can enter a code and any required instructions into the keypad remote 170. Upon verification of the entered information, the keypad remote 170 transmits an activation signal to a receiver in the automated opener motor 122. The automated opener motor 122 acts accordingly. Similarly, the user simply depresses an actuation button on the remote operation transmitter 172 to transmit a signal to the receiver in the automated opener motor 122. The remote operation transmitter 172 allows the driver to retrieve items from inside the cargo trailer 110, begin walking away and automatically lower the trailer access door 112. As the driver approaches the cargo vehicle 100, the user can utilize the remote operation transmitter 172 to open the trailer access door 112 such that the trailer access door 112 is opened when the driver arrives. An opener release handle 140 allows the driver to release the linkage arm to track engaging assembly 128 from the opener track and drive assembly 124, providing access to the cargo trailer 110 should the automated door opening assembly 120 fail. An automated locking assembly 160 can be provided to limit the motion of the trailer access door 112 as desired. Alternately, the remote operation transmitter 172 can be a proximity type device, whereby the system automatically detects when the remote operation transmitter 172 is within range and subsequently opens the door. When the system detects the remote operation transmitter 172 is out of range, the system begins a delay process to ensure the remote operation transmitter 172 is out of range. Upon verification that the remote operation transmitter 172 is out of range, the system closes the door.

Details of an exemplary emergency release system are presented in FIGS. 3 through 6 and 14. An engagement release lever 130 is used to engage and release the linkage arm to track engaging assembly 128 with the opener track and drive assembly 124. The linkage arm to track engaging assembly 128 includes a drive member mating component 132 operated by the engagement release lever 130. The engagement release lever 130 includes a mating component cam 131 that repositions the drive member mating component 132 in accordance with a drive member mating component engaging motion 136. In an engaged configuration (shown in solid lines), the mating component cam 131 engages drive member mating component teeth 134 of the drive member mating component 132 with a drive member 138 located within the opener track and drive assembly 124. In a disengaged configuration, (shown in broken lines), the mating component cam 131 disengages drive member mating component teeth 134 from the drive member 138. The linkage arm to track engaging assembly 128 comprises the components providing a removably engaging coupling, including the drive member mating component 132 in operational communication with the engagement release lever 130. The exemplary embodiment illustrates a commonly known screw drive configuration. It is understood that the system can be adapted to any drive configuration. The opener release handle 140 engages with the engagement release lever 130 via a release cable 144. The release cable 144 can be a cable, a linkage, or any other form of intermediary means, generally referred to as a release control element. The release cable 144 can be actuated via a cam such as a release operable arm 142 attached to the opener release handle 140. When the driver rotates the opener release handle 140 into a release position opener release handle 140' (FIGS. 4 and 6), the release operable arm 142 is rotated into a release position release operable arm 142', pulling the release cable 144'. The release cable 144' (released configuration) positions the engagement release lever 130' in the respective released configuration. The opener release handle 140 can include a lock 146 to ensure against disengagement of the linkage arm to track engaging assembly 128 by an unauthorized party. It is understood that any form factor for a release mechanism that is operable from the exterior of the cargo trailer 110 is desirable. Other exemplary means includes a simple pull ring. The pull ring can be provided positioning a locking bar through the ring.

A slip linkage bracket assembly 150 can be integrated into the automated door opening assembly 120. The slip linkage bracket assembly 150 allows the opener linkage arm 126 to move between a lockdown position referenced as 126' and a door lift position referenced as 126. The slip linkage bracket assembly 150 is fabricated having a linkage arm bracket 152 with a vertical slot 154 arranged vertically therethrough. A linkage pin 156 is disposed through the engaging end of the opener linkage arm 126. The linkage pin 156 is slideably positioned through the vertical slot 154 of the linkage arm bracket 152. A linkage biasing member 158 (the upper and lower portions being illustrated with the center removed for presentation purposes) can be assembled maintaining the opener linkage arm 126 in a raised position. The slideable engagement between the opener linkage arm 126 and the linkage arm bracket 152 allows the automated door opening assembly 120 to partially move independently of the trailer access door 112. This difference in movement can allow for a variety of operations. A first option would be the inclusion of an automated locking assembly 160. The automated locking assembly 160 provides a deadbolt lock by automatically engaging a deadbolt locking bar 162 with a receiving aperture within the roll up door track 118 to create a mechanical lock between the trailer access door 112 and the roll up door track 118. A locking bar bracket 164 guides and maintains the orientation of the deadbolt locking bar 162. A locking bar biasing member 166 ensures the locking assembly control cable 168 remains in a tensile state. As the opener linkage arm 126 moves to an opening position, referenced as 126', the opener linkage arm 126 pulls the locking assembly control cable 168 upwards placing the linkage pin 156 in a position against an upper edge of the vertical slot 154, referenced as 156'. The applied tension to the locking assembly control cable 168 causes the deadbolt locking bar 162 to disengage from the roll up door track 118. A cable expansion assembly 169 can be provided along the locking assembly control cable 168 to compensate for tolerances, shock, and the like. The exemplary cable expansion assembly 169 is a biased expansion assembly. When the trailer access door 112 is lowered, the opener linkage arm 126 removes the tension from the locking assembly control cable 168, thus the locking bar biasing member 166 biases the deadbolt locking bar 162 to engage with the aperture of the roll up door track 118. An emergency release handle (similar to the opener release handle 140) can be integrated with the locking assembly control cable 168 should the automated door opening assembly 120 or other operable element fail. It is understood that the sliding engaging design (as shown) can alternately be operable via a pivotal motion to engage and disengage the locking bar from the track. The locking bar would pivot between a locked and an unlocked orientation.

Figure 9:
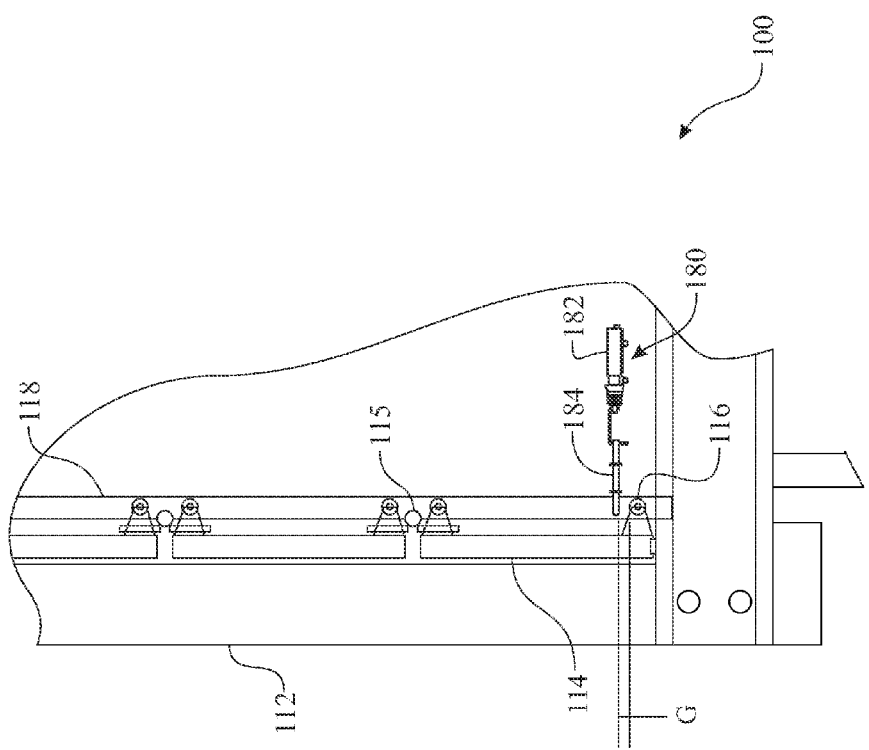
FIG. 9 presents a side, elevation view of an actuator and deadbolt assembly installed at a location to limit the vertical motion of the roll up cargo door by positioning the deadbolt to interfere with a motion of the wheel along the track.
Figure 10:
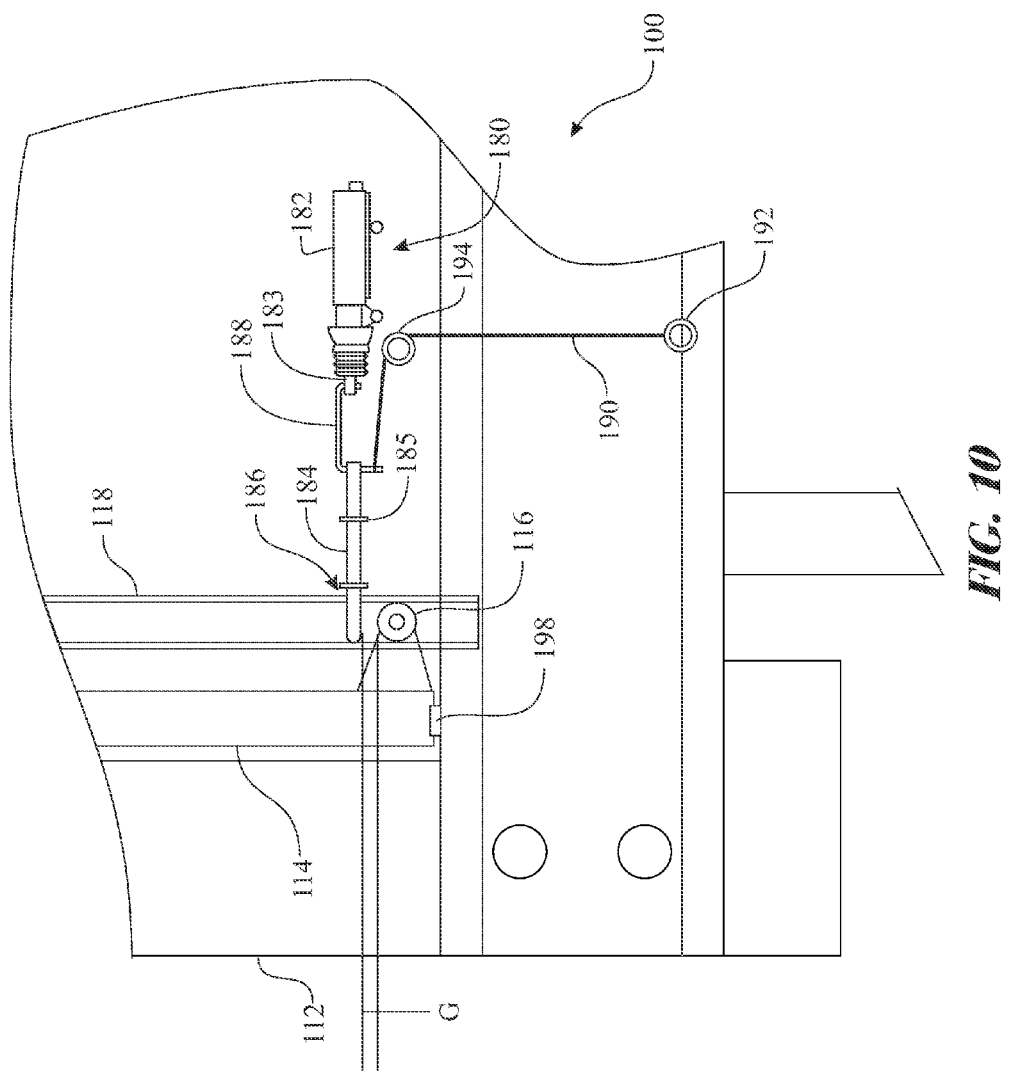
FIG. 10 presents a detailed view of the actuator and deadbolt assembly of FIG. 9, further illustrating an exemplary emergency release mechanism.

A remote deadbolt assembly 180, as illustrated in FIGS. 9 and 10, can be integrated as an alternative to the automated locking assembly 160. The remote deadbolt assembly 180 includes a deadbolt actuator 182 for operating a deadbolt pin 184. The deadbolt pin 184 is slideably assembled through a deadbolt bracket 185, wherein the deadbolt bracket 185 provides support and registration of the deadbolt pin 184 to a deadbolt receiving aperture 186 through the roll up door track 118. The deadbolt actuator 182 moves an actuating arm 183. A linkage arm 188 provides connectivity between the actuating arm 183 and the deadbolt pin 184. The deadbolt pin 184 is inserted above a contacting surface of the door wheels 116 at a distance identified as gap "G". The gap "G" allows an unauthorized party to move the trailer access door 112 upwards allowing a proximity alarm sensor 198 to change state. An emergency release cable 190 is included, as a component of the remote deadbolt assembly 180 allowing a party to disengage the deadbolt pin 184 from the deadbolt receiving aperture 186 should the deadbolt actuator 182 or another component fail. A release ring 192 can be provided at a distal end of the emergency release cable 190, aiding the party in pulling the emergency release cable 190. At least one redirecting element 194 can be utilized to redirect the emergency release cable 190 as desired to properly disengage the deadbolt pin 184 from the deadbolt receiving aperture 186. The release ring 192 can be secured via a locking bar to ensure against unauthorized disengagement.

Figure 11:
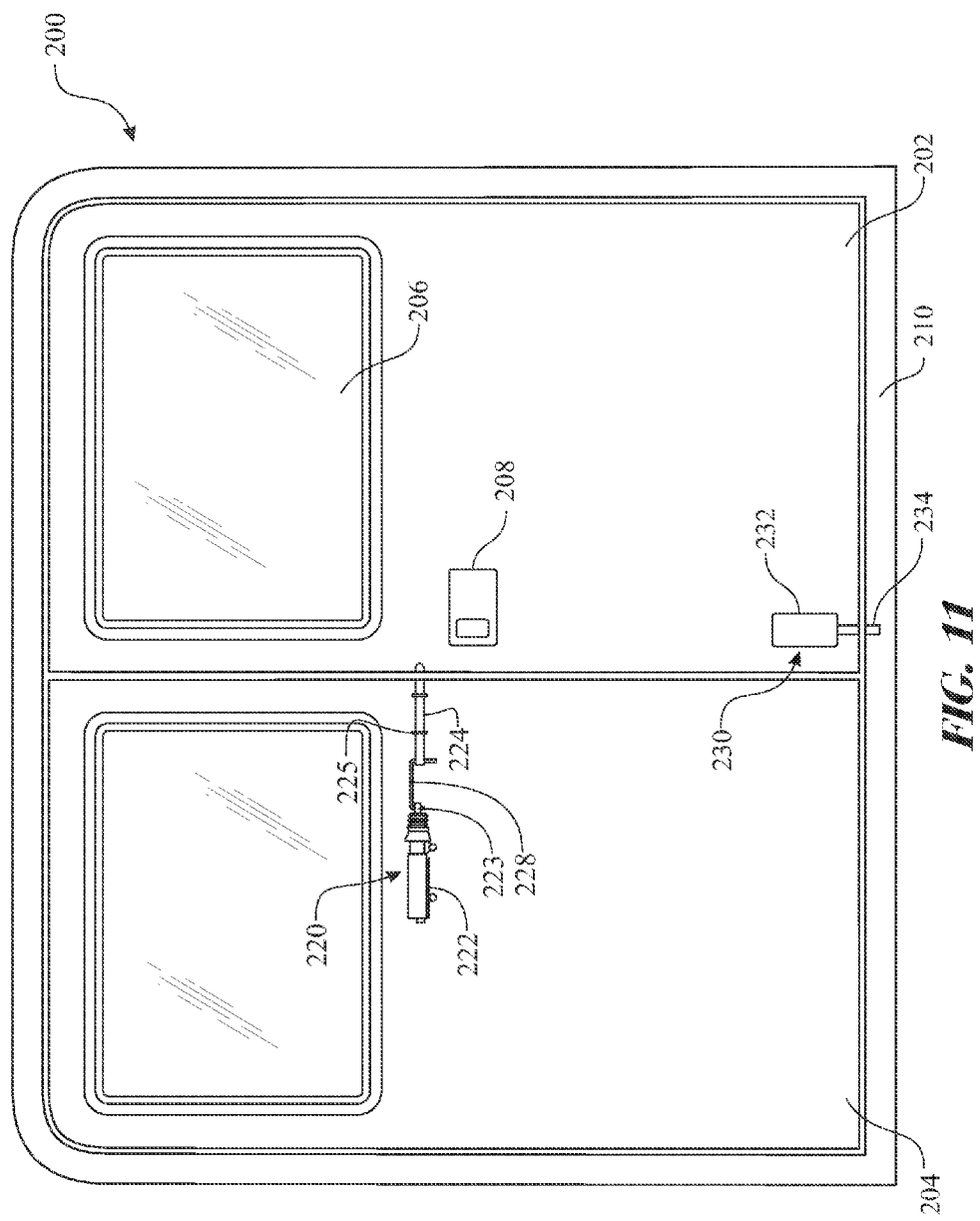
FIG. 11 presents two exemplary actuator deadbolt locking embodiments for securing a vehicle door.
Figure 12:
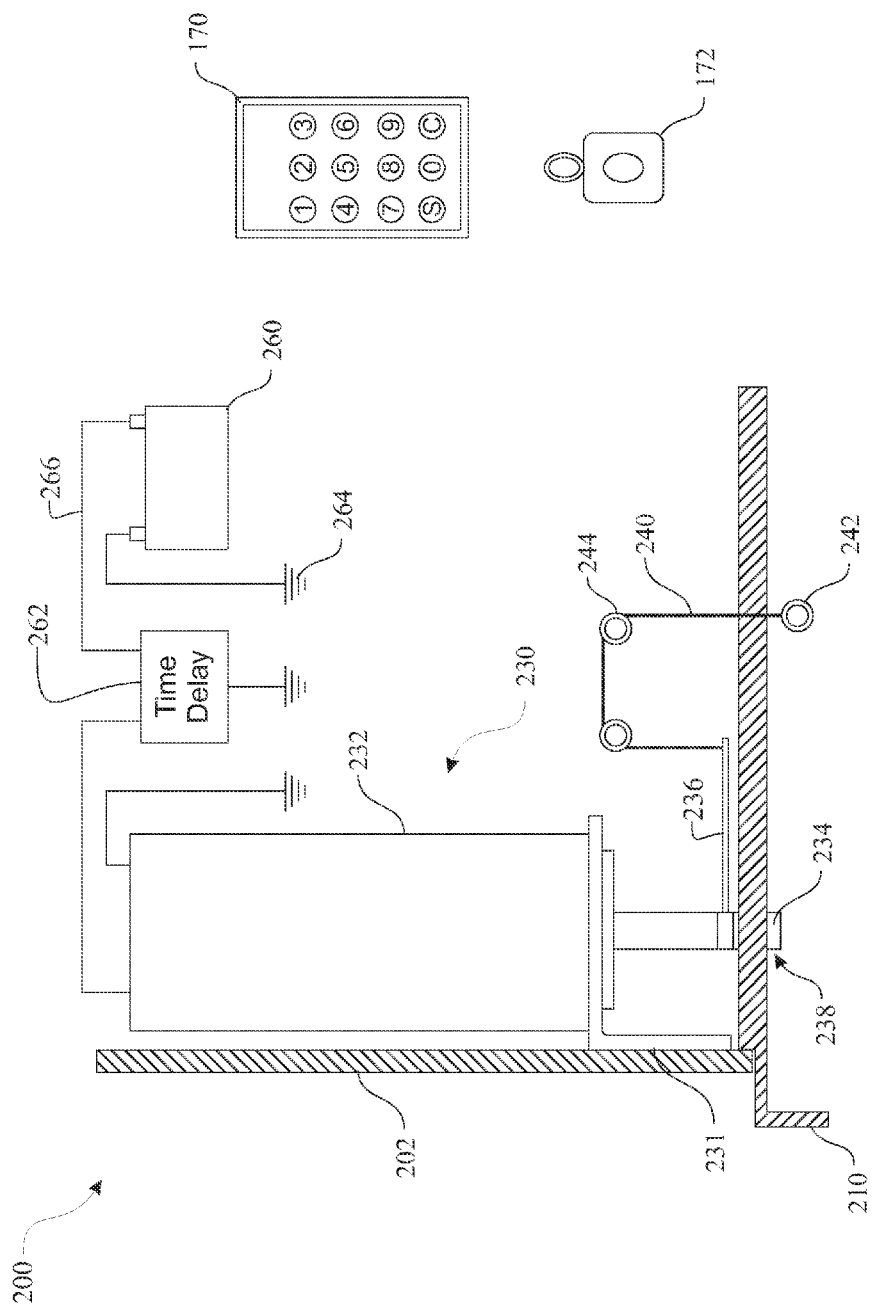
FIG. 12 presents an exemplary detailed diagram of the exemplary actuator deadbolt locking assembly incorporating an emergency release mechanism.

The trailer access door 112 is one of several potential access means to the cargo vehicle 100. Security is required at all access means to properly secure the cargo vehicle 100. A two-door security configuration is presented in FIG. 11, with exemplary detailed embodiments being presented in FIGS. 12 and 13. An exemplary vehicle door assembly 200 demonstrates several potential locking means for securing a primary door 202 and a secondary door 204. Each door 202, 204 generally includes a door window 206, which unfortunately, provides an access means for an unauthorized party. The unauthorized party could break the door window 206, allowing the party to unlock the door and simply open the primary door 202 via a door handle 208. The primary door 202 overlaps a mating edge of the secondary door 204, thus only requiring a means for securing the primary door 202.

The vehicle door assembly 200 can be secured via either a door-to-door deadbolt assembly 220 or a door to frame deadbolt assembly 230. The door-to-door deadbolt assembly 220 comprises a configuration similar to the remote deadbolt assembly 180 (FIGS. 9 and 10). The door-to-door deadbolt assembly 220 includes a deadbolt actuator 222 for operating a deadbolt pin 224. The deadbolt pin 224 is slideably assembled through a deadbolt bracket 225, wherein the deadbolt bracket 225 provides support and registration of the deadbolt pin 224 to an aperture provided in the adjacent door (or doorframe for a single door). The deadbolt actuator 222 moves an actuating arm 223. A linkage arm 228 provides connectivity between the actuating arm 223 and the deadbolt pin 224.

In an alternate embodiment, the door to frame deadbolt assembly 230 engages the primary door 202 with a doorframe 210, securing the door in a closed position. The door to frame deadbolt assembly 230 includes a deadbolt actuator 232 and a deadbolt pin 234. The deadbolt actuator 232 adjusts the deadbolt pin 234 to engage and disengage with a deadbolt receiving aperture 238 through the doorframe 210. The door to frame deadbolt assembly 230 can include a deadbolt assembly mounting bracket 231 for attaching the deadbolt actuator 232 to the primary door 202. Power is provided to the deadbolt actuator 232 via a power source 260. Power is transferred between the various components via a series of electrical cables 266. The components can be connected to a ground connection 264, such as the chassis of the cargo vehicle 100, which is commonly used. An optional time delay 262 can be provided between the power source 260 and the deadbolt actuator 232, allowing the user time to exit the vehicle prior to actuation of the deadbolt actuator 232. The door to frame deadbolt assembly 230 can be operated via a keypad remote 170 or remote operation transmitter 172 as previously described. Should a component fail in the door to frame deadbolt assembly 230, the operator would be denied access to the cargo vehicle 100. An emergency release cable 240 is secured directly or indirectly (such as via a release arm 236) to the deadbolt pin 234 allowing the user the ability to disengage the deadbolt pin 234 from the deadbolt receiving aperture 238 as needed. A release ring 242 can be provided at a distal end of the emergency release cable 240 for aiding a party in disengaging the deadbolt pin 234 from the deadbolt receiving aperture 238. The emergency release cable 240 can be guided through at least one redirecting element 244 to provide proper operative flow. Although a cable is illustrated, it is understood that any mechanical configuration can be utilized, such as a cantilever, a series of linkages, and the like. The release ring 242 can be secured via a locking bar to ensure against unauthorized disengagement.

Figure 13:
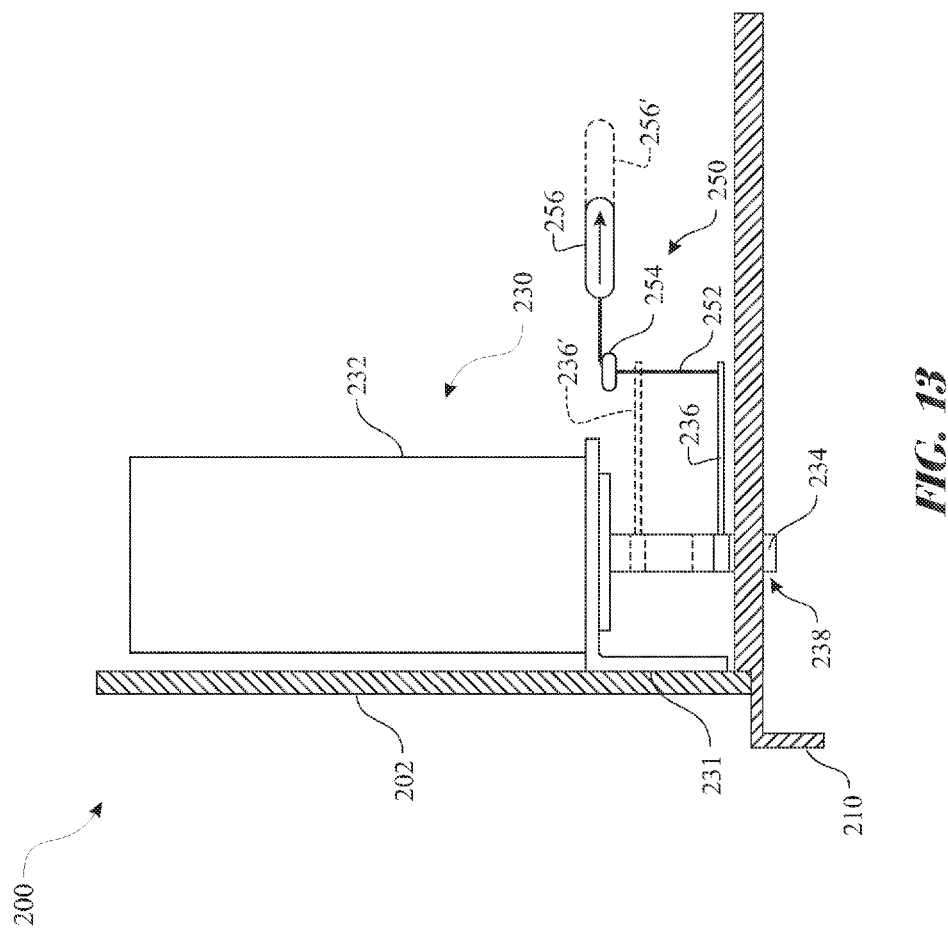
FIG. 13 presents an exemplary detailed diagram of the exemplary actuator deadbolt locking assembly incorporating an inertially operated emergency release mechanism.
Figure 14:
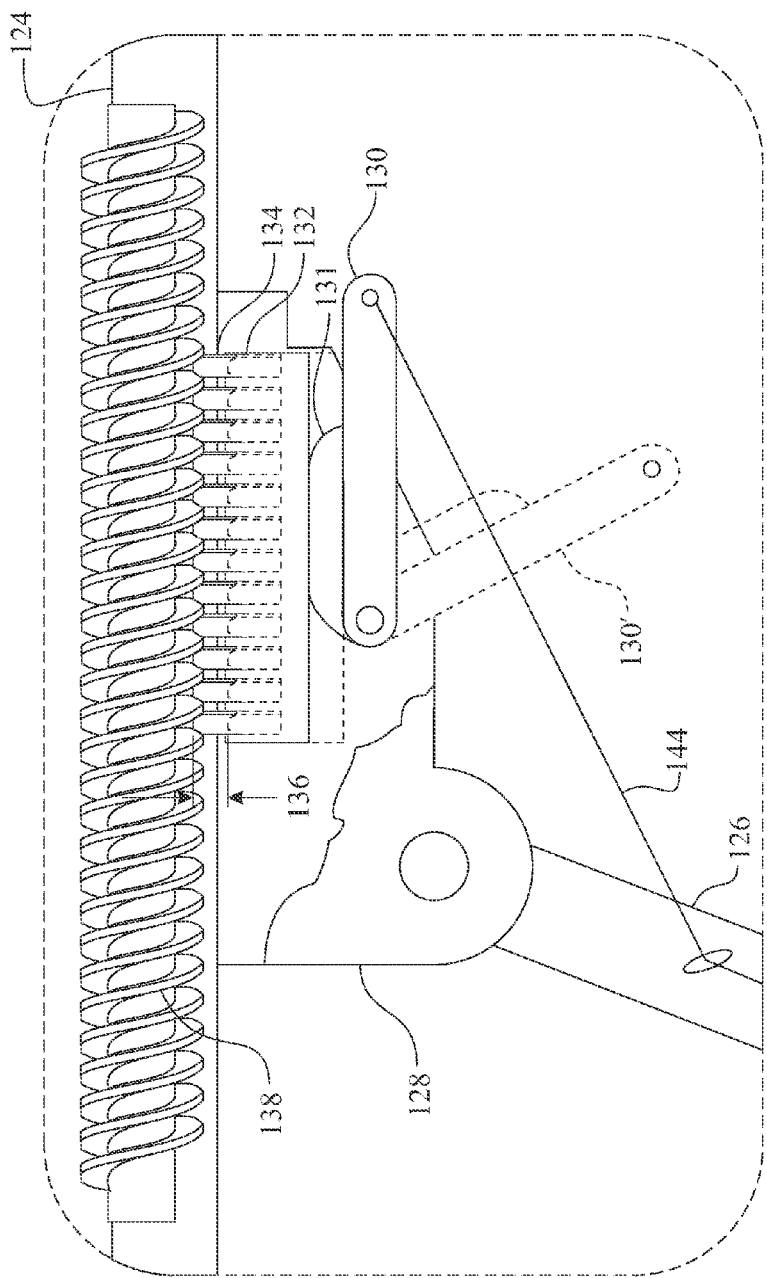
FIG. 14 presents a partially sectioned side view of an exemplary linkage arm to track engaging assembly shown engaged in solid lines and disengaged in broken lines.

An inertial release mechanism 250 can be integrated with the door to frame deadbolt assembly 230 as illustrated in FIG. 13. The inertial release mechanism 250 disengages the deadbolt pin 234 by driving the release arm 236 to a position referenced as 236'. The inertial release mechanism 250 utilizes an inertial release actuator 256 positioned on or within a supporting surface (not shown). An inertial release cable 252 is attached between the inertial release actuator 256 and the release arm 236. The inertial release cable 252 can be routed through one or more inertial release cable controls 254 as needed to adequately route the inertial release cable 252. The inertial release actuator 256 moves from a set position to an inertial releasing position referenced as 256'. During an abrupt change in motion, the inertial release actuator 256 is repositioned. The inertial release actuator 256 would be of a sufficient mass to apply a tension to the inertial release cable 252, thus moving the release arm 236. The inertial release mechanism 250 can be combined with the emergency release cable 240. It is understood that an emergency release system can be integrated with an airbag activation sensor.

In an alternative embodiment, the doors can be secured using an inertial safety releasing vehicle deadbolt assembly 300, as illustrated in FIGS. 15 through 23. The inertial safety releasing vehicle deadbolt assembly 300 includes an inertial safety releasing deadbolt subassembly 320 and the associated operating elements assembled to a deadbolt housing 310. The deadbolt housing 310 is preferably secured to the primary door 202 in a vertical orientation at a location aligning the inertial safety releasing deadbolt subassembly 320 with a doorframe deadbolt engaging feature 214. The deadbolt housing 310 can be assembled to the primary door 202 using any suitable assembly techniques. The illustration includes a deadbolt assembly mount 380, wherein the deadbolt assembly mount 380 is representative of any suitable assembly interface, including a bracket, mechanical fasteners, welding, adhesive, and the like. The doorframe deadbolt engaging feature 214 is preferably an aperture or depression formed within the doorframe 210 of the vehicle. The doorframe deadbolt engaging feature 214 preferably extends inward from a doorframe interior surface 212 of the doorframe 210

The deadbolt housing 310 is preferably fabricated of a tubular member. A deadbolt housing top member 312 is assembled to an upper end of the deadbolt housing 310. A deadbolt housing base member 314 is assembled to a lower end of the deadbolt housing 310. A deadbolt registration member 318 is integrated into the deadbolt housing base member 314. A deadbolt registration member aperture 319 is formed through the deadbolt registration member 318. The deadbolt registration member aperture 319 is preferably formed having an inverted frustum shape, wherein the inverted frustum shape enables the inertial safety releasing deadbolt 322 to pivot away from a vertical orientation. A retention element 352 is preferably formed as an elongated member that is supported by the deadbolt housing top member 312. The retention element 352 extends from the deadbolt housing top member 312 towards a center region of the interior of the deadbolt housing 310, terminating at a deadbolt retention surface 356. The retention element 352 is preferably oriented parallel to an elongated central axis of the inertial safety releasing deadbolt 322 locating the deadbolt retention surface 356 centrally within the interior of the deadbolt housing 310.

The axial surface 354 or exterior surface of the retention element 352 is preferably continuous along at least a majority of a length of the retention element 352. The axial surface 354 can be used as an axial guide for motion of a deadbolt seating element 360 of an operational control subassembly 350. A seating element axial bore 362 is formed axially through the deadbolt seating element 360. The seating element axial bore 362 is formed having a cross sectional shape compatible with the cross sectional shape of the axial surface 354, enabling the deadbolt seating element 360 to slide along the respective length of the retention element 352. Although the exemplary embodiment utilizes the retention element 352 as an axis to guide the motion of the deadbolt seating element 360, it is understood that the motion of the deadbolt seating element 360 can be guided by any suitable embodiment known by those skilled in the art. The deadbolt seating element 360 includes a deadbolt seating surface 364 formed in an interior surface. Although the exemplary deadbolt seating surface 364 is formed in a frustum shape, it is understood that the deadbolt seating surface 364 can be formed in any suitable shape to accommodate the desired function. Motion of the deadbolt seating element 360 can be provided by any suitable motion controlling device, including a motor, an inductive linear motion motor, a linear motor, and the like.

The inertial safety releasing deadbolt subassembly 320 includes an inertial safety releasing deadbolt 322. The inertial safety releasing deadbolt 322 is formed as an elongated member having a cylindrical shape extending between an actuating deadbolt end 326 and a conically shaped deadbolt engaging end 324. The inertial safety releasing deadbolt 322 is oriented placing the actuating deadbolt end 326 within an interior of the deadbolt housing 310 and proximate the deadbolt retention surface 356 of the retention element 352. The conically shaped deadbolt engaging end 324 is located within the deadbolt registration member aperture 319. Motion of the inertial safety releasing deadbolt 322 is controlled by geometry of various features within the interior of the deadbolt housing 310 and various operational elements integrated into the inertial safety releasing vehicle deadbolt assembly 300. An upward force is provided by engagement of a biasing element 330 against a biasing element retention flange 332. The biasing element retention flange 332 is either affixed to or formed as a unitary element with the inertial safety releasing deadbolt 322. The biasing element 330 is inserted between opposing surfaces of the deadbolt registration member 318 and the biasing element retention flange 332.

Figure 15:
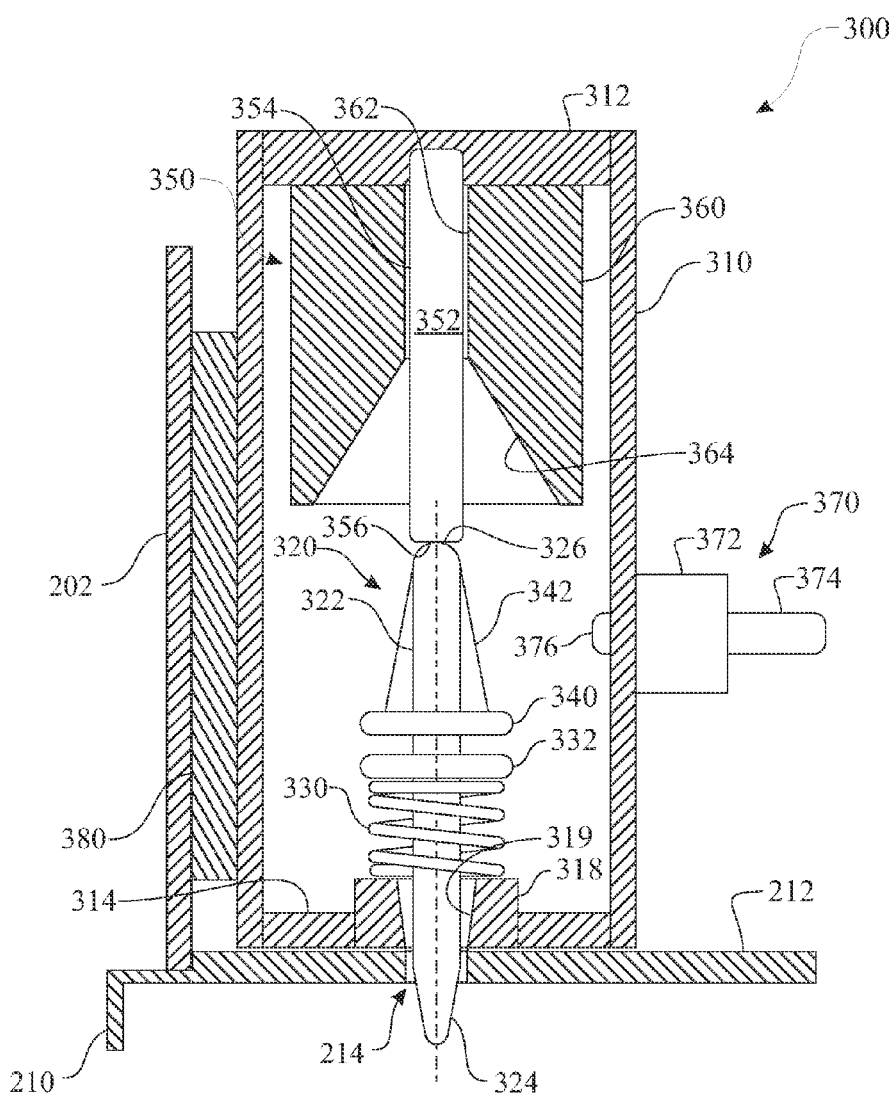
FIG. 15 presents a partially section view of an exemplary inertial safety releasing vehicle deadbolt assembly, the safety releasing deadbolt assembly being illustrated in an engaging or locked configuration.

The inertial safety releasing deadbolt 322 toggles between an engaging configuration and a release configuration. In the engaging configuration, the conically shaped deadbolt engaging end 324 is positioned extending outward an exterior plane of the deadbolt registration member aperture 319 and engaging with the doorframe deadbolt engaging feature 214. In the exemplary embodiment, the doorframe deadbolt engaging feature 214 is formed as an aperture or a depression and the conically shaped deadbolt engaging end 324 extends therein. The inertial safety releasing deadbolt 322 provides a mechanical lock between the deadbolt registration member 318 and the doorframe deadbolt engaging feature 214, thus limiting the relative motion between the primary door 202 and the doorframe 210. Essentially, the insertion of the conically shaped deadbolt engaging end 324 into the doorframe deadbolt engaging feature 214 locks the primary door 202 from opening. The inertial safety releasing deadbolt 322 is retained in position by positioning the actuating deadbolt end 326 in contact with a deadbolt retention surface 356. The biasing element 330 is compressed, providing a biasing force retaining the actuating deadbolt end 326 and deadbolt retention surface 356 in communication with one another. The center of the deadbolt retention surface 356 is perpendicular to the longitudinal axis of the inertial safety releasing deadbolt 322. This retains the inertial safety releasing deadbolt 322 in the engaging configuration as illustrated in FIG. 15.

The inertial safety releasing deadbolt 322 toggles from the engaging configuration to the release configuration when subjected to a releasing or lateral force. The releasing or lateral force can be applied to the inertial safety releasing deadbolt 322 by either the inertial release mechanism 340 when subjected to an inertial force or an operational release pin 374 when directed by the user.

Figure 16:
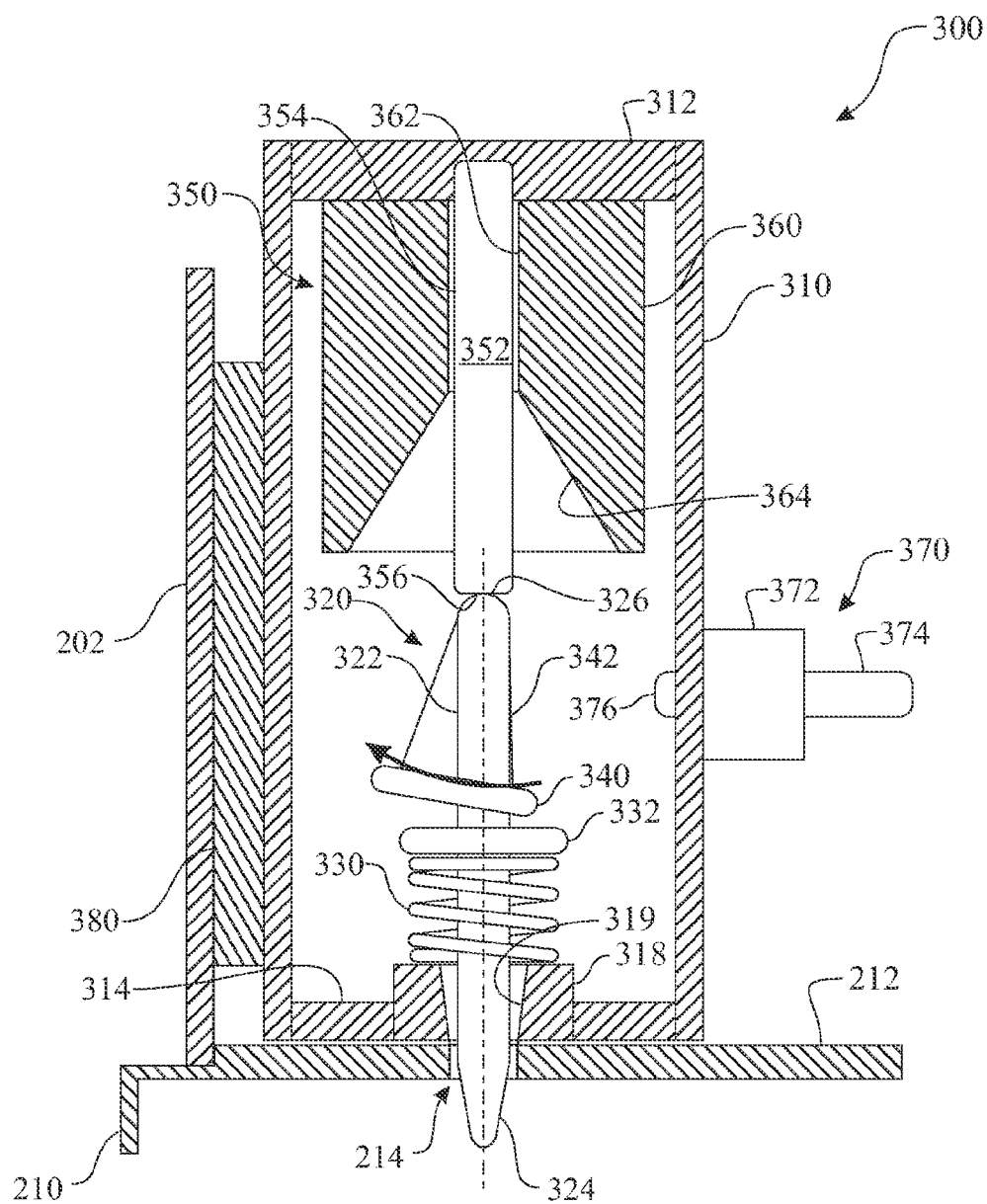
FIG. 16 presents a partially section view of the exemplary inertial safety releasing vehicle deadbolt assembly originally introduced in FIG. 15, the safety releasing deadbolt assembly being illustrated in an engaging or locked configuration and subjected to an inertial release force.

The inertial release mechanism 340 can be moveably attached to the inertial safety releasing deadbolt 322 by an inertial release mechanism support element 342. It is understood that the inertial release mechanism 340 can be retained in position by any retention element. The retention element can be attached to the deadbolt housing 310, the inertial safety releasing deadbolt 322, or any other suitable element within the inertial safety releasing vehicle deadbolt assembly 300. The retention element is designed enabling motion of the inertial release mechanism 340 when subjected to a change in acceleration. The friction between the actuating deadbolt end 326 and the deadbolt retention surface 356 retains the inertial safety releasing deadbolt 322 in position during normal acceleration and braking. The weight of the inertial release mechanism 340 is designed to generate sufficient force to separate the inertial safety releasing deadbolt 322 and the retention element 352 when the vehicle is involved in an accident as illustrated in FIG. 16.

Figure 17:
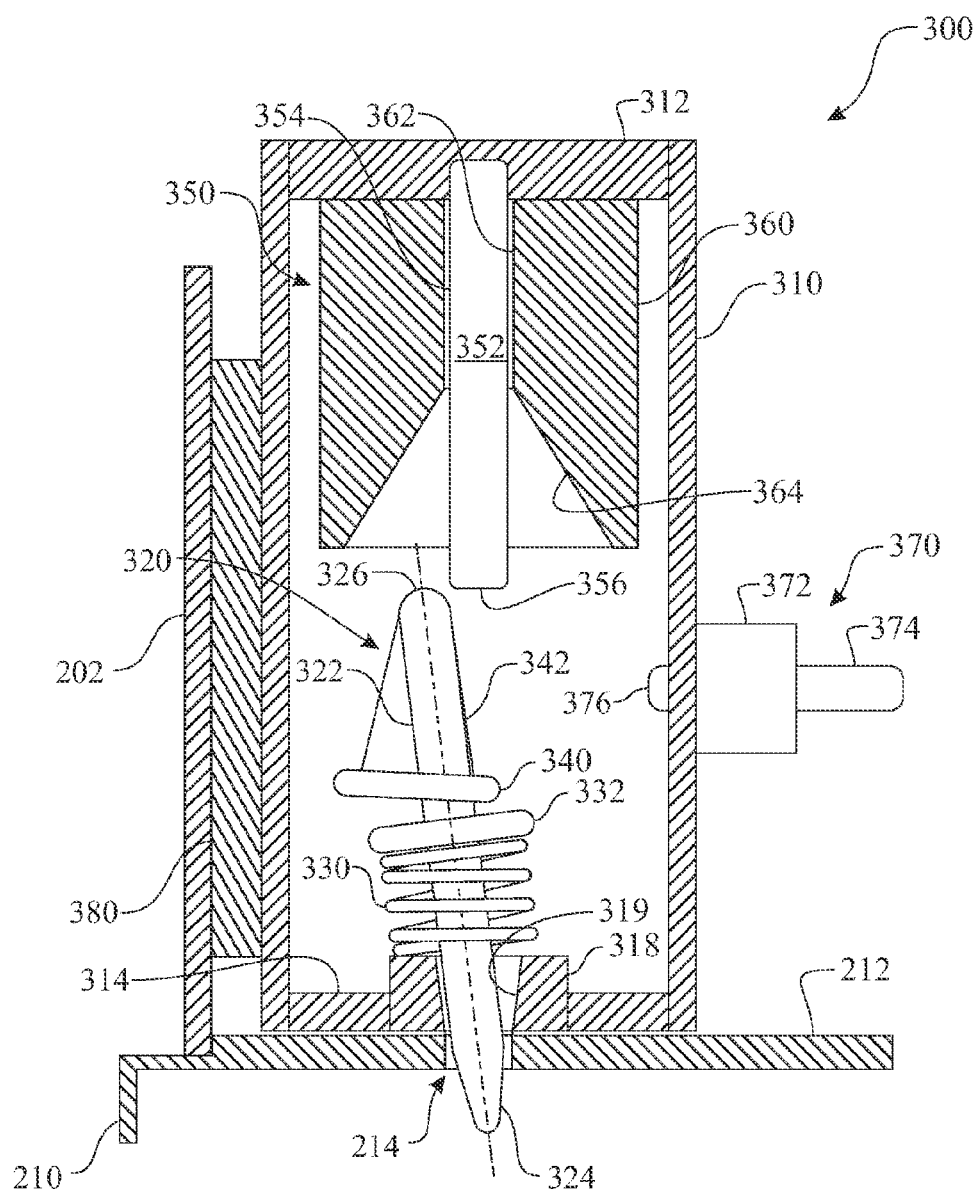
FIG. 17 presents a partially section view of the exemplary inertial safety releasing vehicle deadbolt assembly originally introduced in FIG. 15, the safety releasing deadbolt assembly being illustrated in a disengaging or unlocking configuration resulting from the inertial release force.
Figure 18:
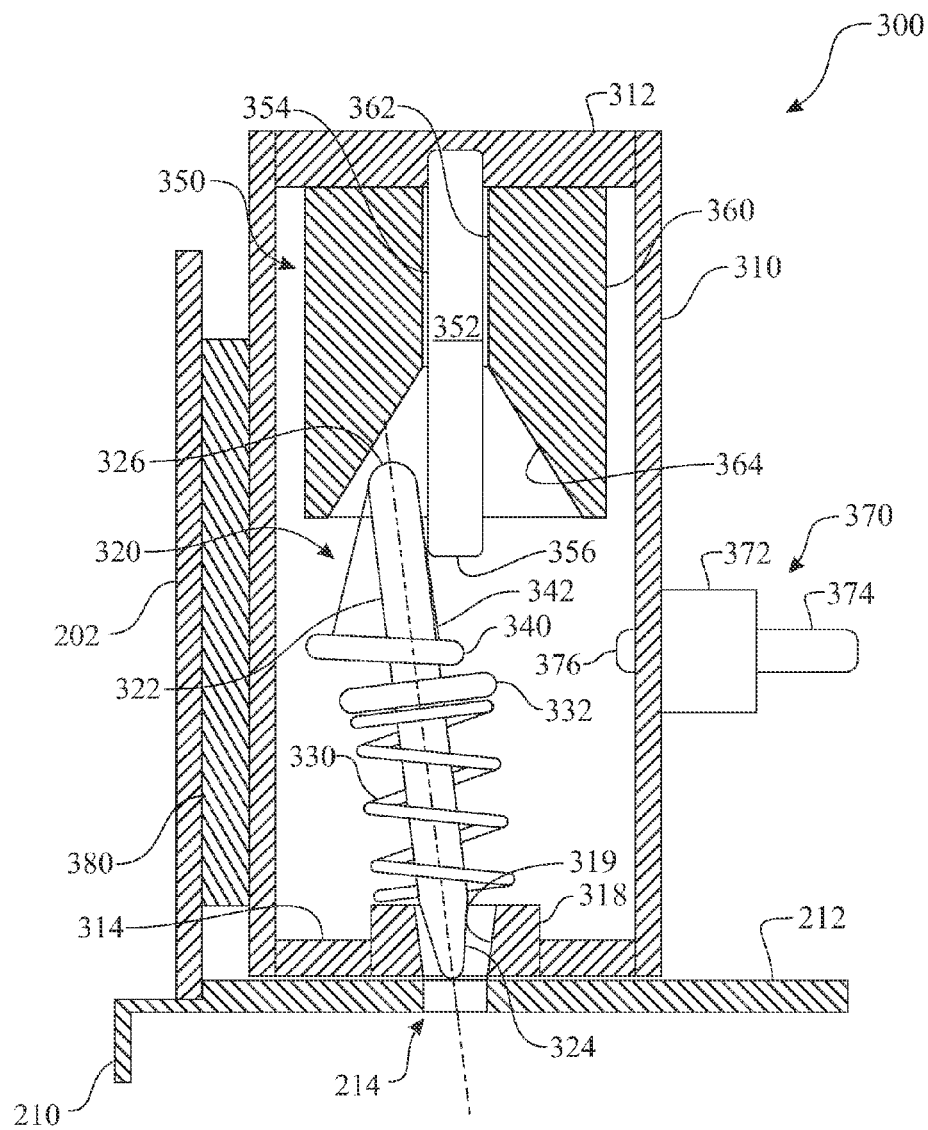
FIG. 18 presents a partially section view of the exemplary inertial safety releasing vehicle deadbolt assembly originally introduced in FIG. 15, the safety releasing deadbolt assembly being illustrated in a disengaging motion generated by a biasing force.

When the vehicle is involved in an accident, the inertial release mechanism 340 generates a sufficient force to separate the inertial safety releasing deadbolt 322 and the retention element 352. The applied force pivots or angles the inertial safety releasing deadbolt 322 from vertical, separating the inertial safety releasing deadbolt 322 and the retention element 352 as illustrated in FIG. 17. Once the retention force is removed from the inertial safety releasing deadbolt 322, the biasing force generated by the biasing element 330 forces the inertial safety releasing deadbolt 322 upwards, removing the conically shaped deadbolt engaging end 324 from the doorframe deadbolt engaging feature 214 as illustrated in FIG. 18. The upper end of the inertial safety releasing deadbolt 322 is urged upwards into the cavity defined by the deadbolt seating surface 364. The upward biasing force generated by the biasing element 330 retains the inertial safety releasing deadbolt 322 in a displaced position. With the conically shaped deadbolt engaging end 324 separated from the doorframe deadbolt engaging feature 214, the primary door 202 is free to move. The primary door 202 remains unsecured until the user directs the inertial safety releasing vehicle deadbolt assembly 300 to toggle to the engaging configuration.

Figure 19:
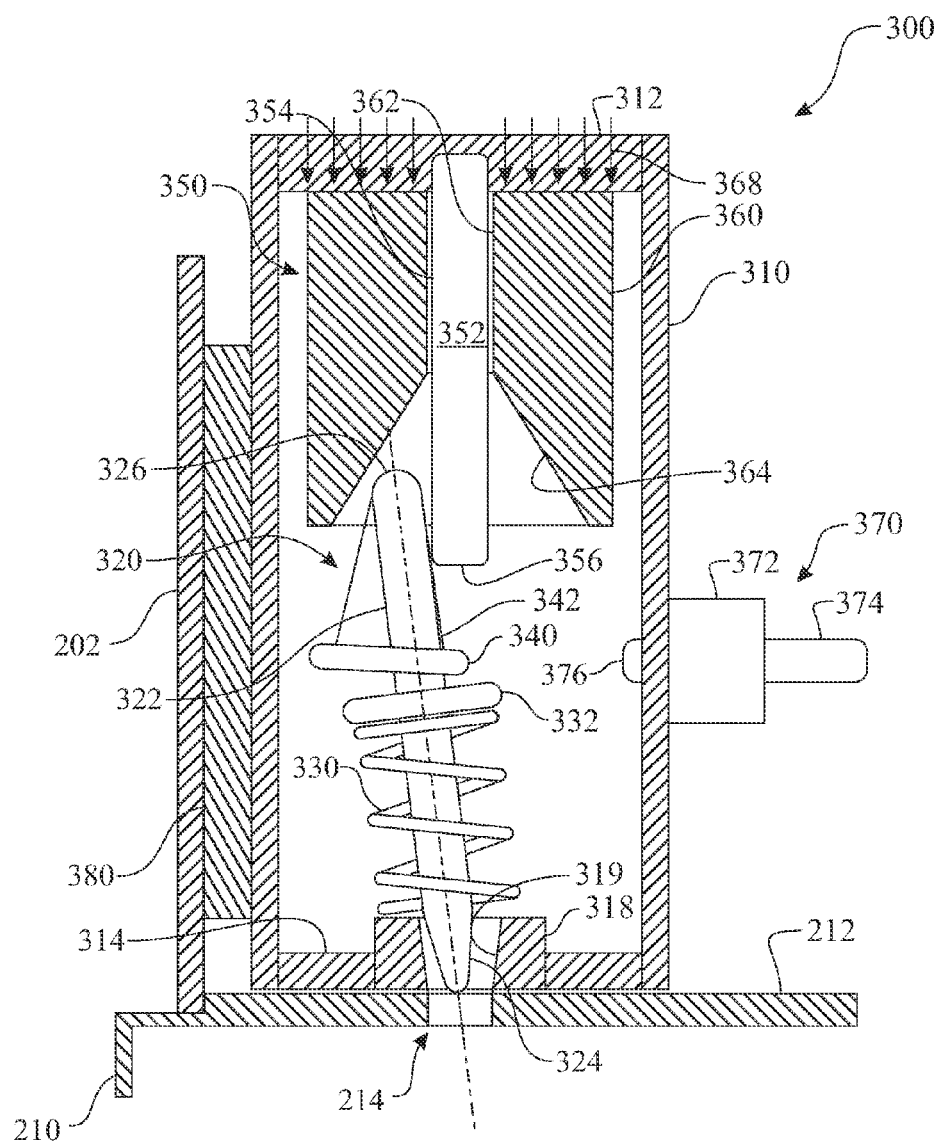
FIG. 19 presents a partially section view of the exemplary inertial safety releasing vehicle deadbolt assembly originally introduced in FIG. 15, the illustration introducing a resetting force.
Figure 20:
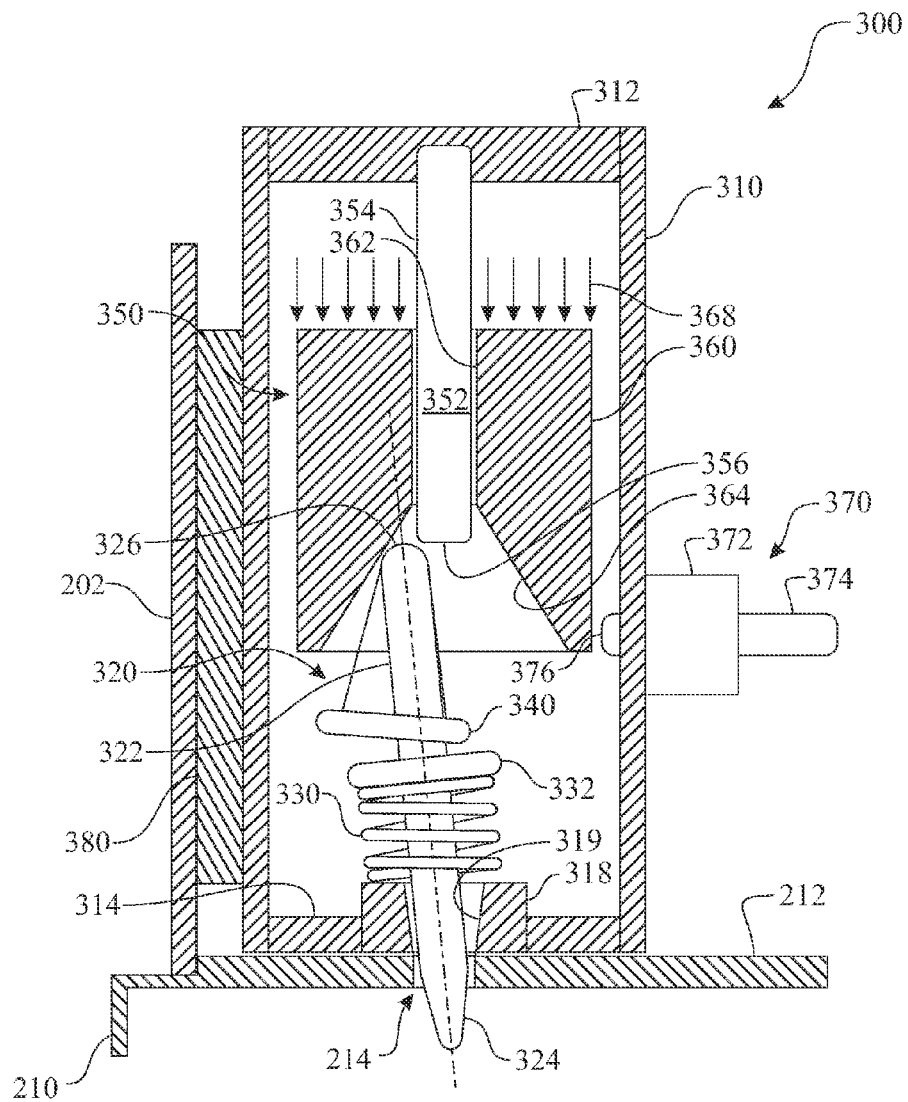
FIG. 20 presents a partially section view of the exemplary inertial safety releasing vehicle deadbolt assembly originally introduced in FIG. 15, illustrating an operational control subassembly initializing a resetting process returning a deadbolt into the engaging configuration.
Figure 21:
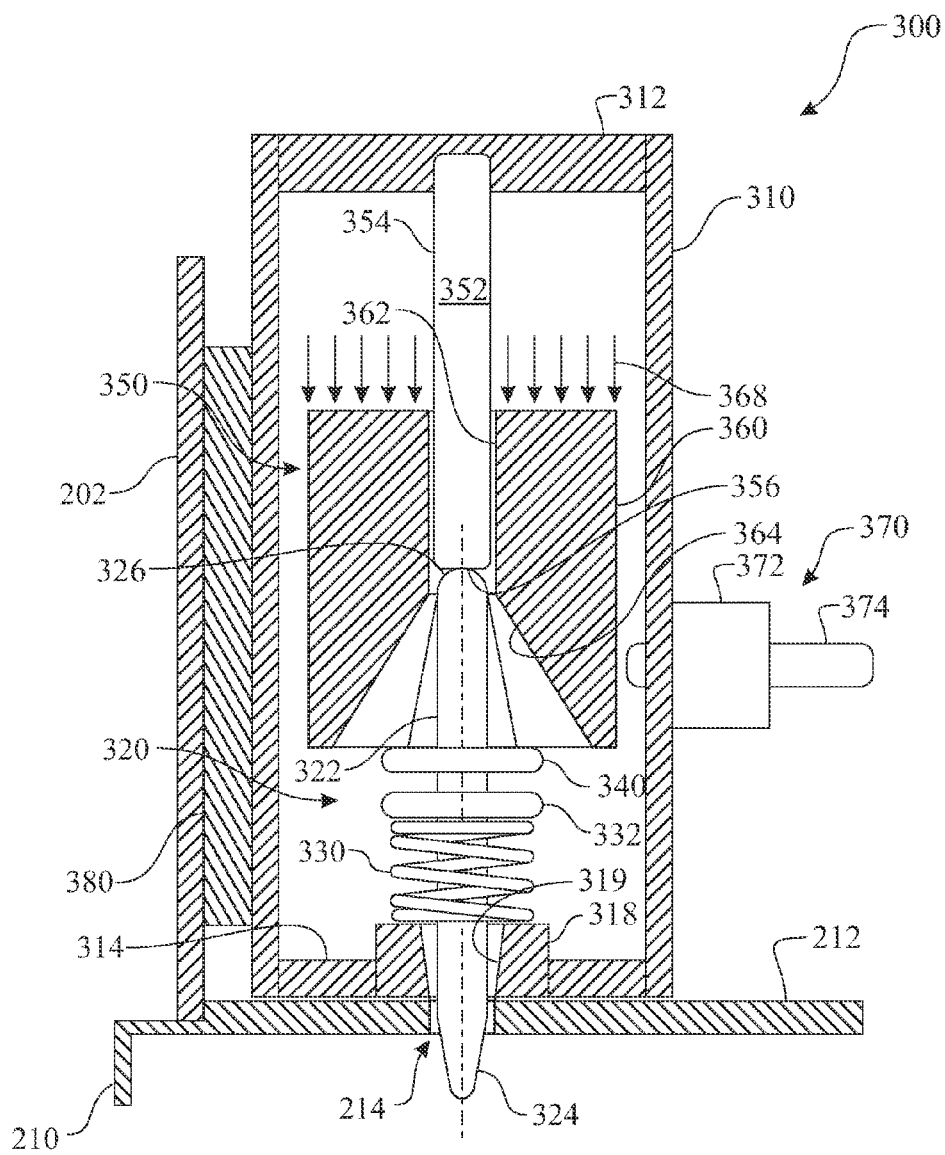
FIG. 21 presents a partially section view of the exemplary inertial safety releasing vehicle deadbolt assembly originally introduced in FIG. 15, illustrating the operational control subassembly reseating the deadbolt in the engaging configuration.
Figure 22:
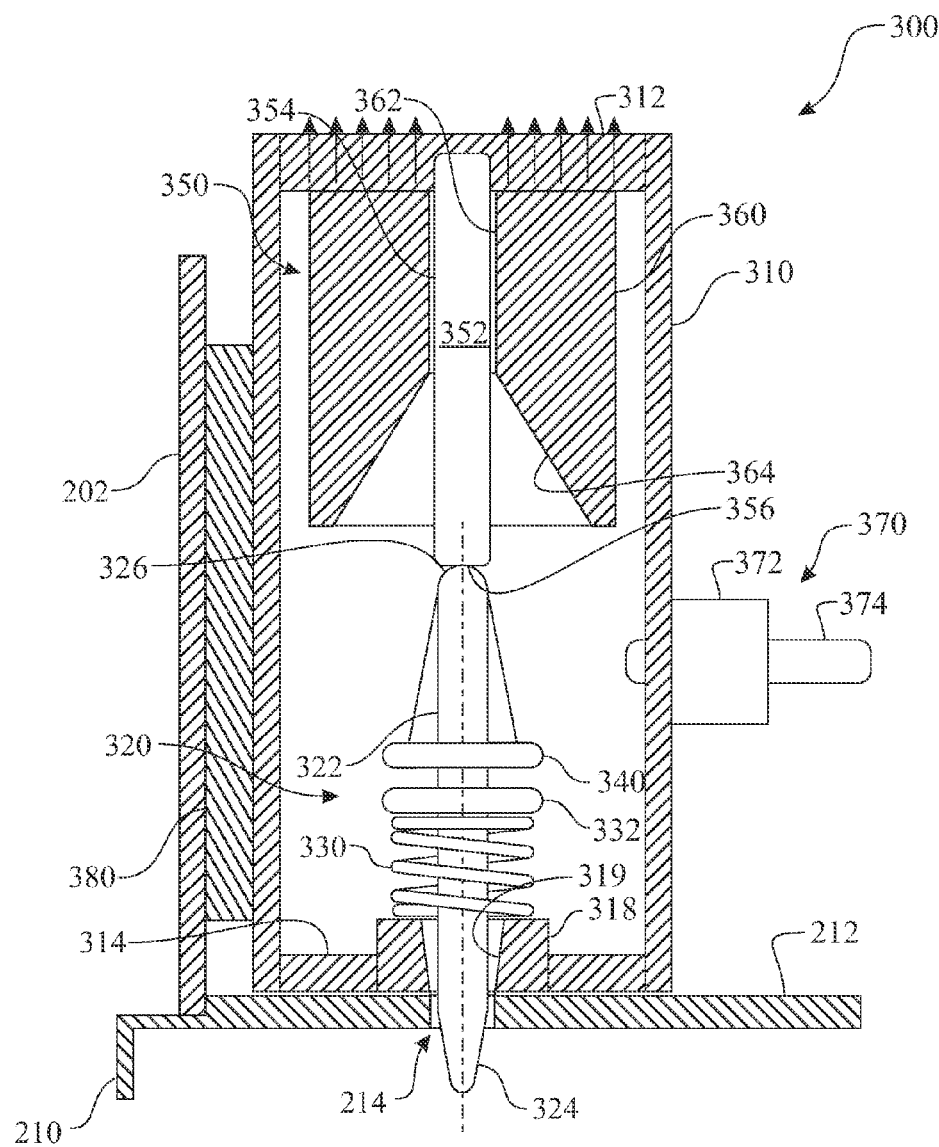
FIG. 22 presents a partially section view of the exemplary inertial safety releasing vehicle deadbolt assembly originally introduced in FIG. 15, wherein the operational control subassembly is shown returned to a staged configuration.
Figure 23:
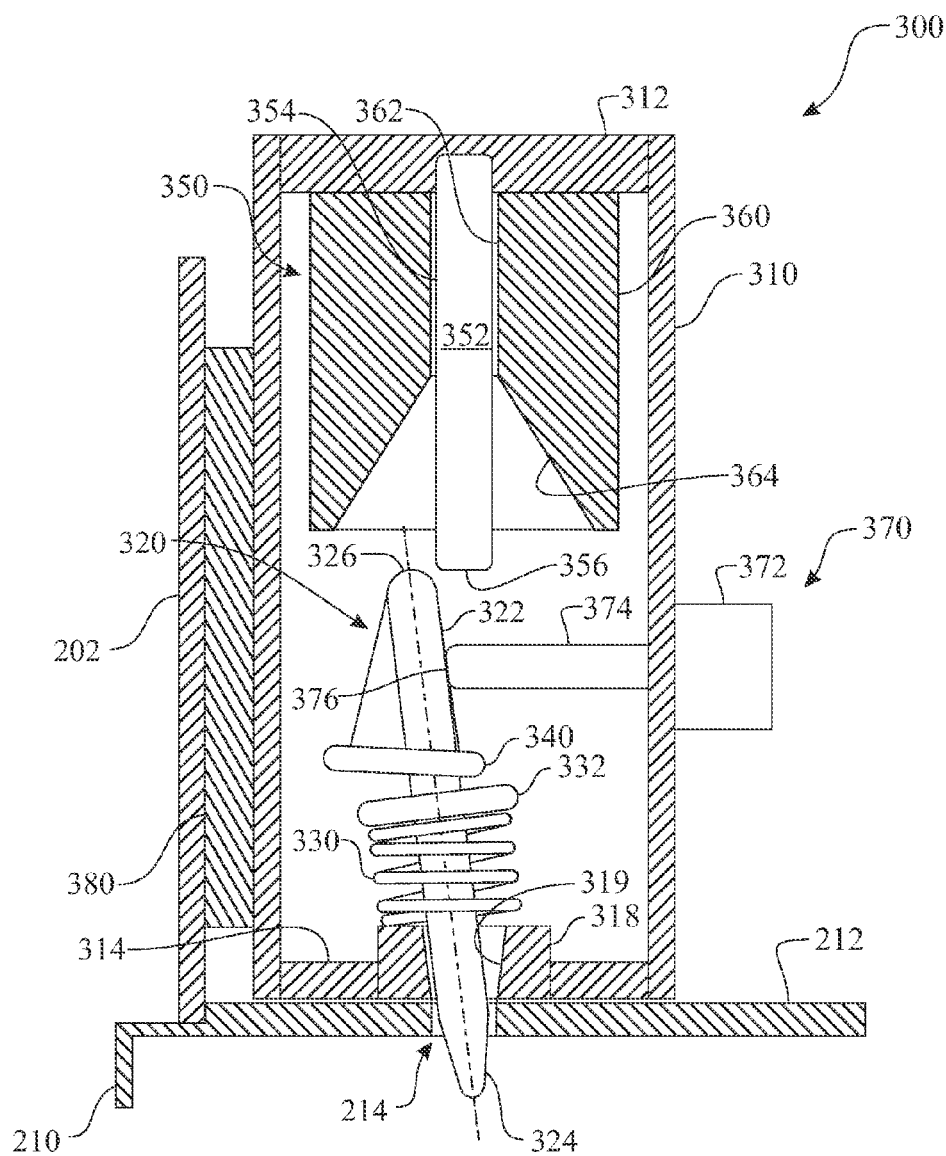
FIG. 23 presents a partially section view of the exemplary inertial safety releasing vehicle deadbolt assembly originally introduced in FIG. 15, introducing a user controlled operational release subassembly.

Upon direction from the user to return the inertial safety releasing vehicle deadbolt assembly 300 to the engaging configuration, a reset force 368 is generated by an operating motor (not shown) and applied to the deadbolt seating element 360. The deadbolt seating element 360 is driven towards the deadbolt housing base member 314 by the reset force 368. The actuating deadbolt end 326 engages with the deadbolt seating surface 364. The deadbolt seating surface 364 drives the inertial safety releasing deadbolt 322 downward, against the biasing force generated by the biasing element 330. The shape of the deadbolt seating surface 364 directs the actuating deadbolt end 326 into position against the deadbolt retention surface 356, as illustrated in FIGS. 19 through 21. The conically shaped deadbolt engaging end 324 in combination with the shape of the deadbolt registration member aperture 319 additionally guides the inertial safety releasing deadbolt 322 into position respective to the doorframe deadbolt engaging feature 214. It is noted that the diameter of the seating element axial bore 362 is approximate to the diameter of the inertial safety releasing deadbolt 322. This optimizes the registration between the actuating deadbolt end 326 and the deadbolt retention surface 356. The deadbolt seating element 360 is drawn back to a staged position to finalize the resetting process, as illustrated in FIG. 22.

Manually directed disengagement or release of the inertial safety releasing deadbolt 322 from the doorframe deadbolt engaging feature 214 can be accomplished by utilizing an operational release subassembly 370. The operational release subassembly 370 includes an operational release actuator 372, which operates an operational release pin 374. The operational release pin 374 is driven towards and in contact with the inertial safety releasing deadbolt 322 by the operational release actuator 372, wherein a release pin contacting end 376 of the operational release pin 374 applies a dislodging force to the inertial safety releasing deadbolt 322. The dislodging force separates the actuating deadbolt end 326 from the deadbolt retention surface 356. As previously mentioned, the biasing element 330 applies an upward biasing force to the biasing element retention flange 332, urging the conically shaped deadbolt engaging end 324 away from the doorframe deadbolt engaging feature 214. Once the actuating deadbolt end 326 is separated from the deadbolt retention surface 356, the operational release pin 374 retracts to a staged configuration.

Alternatively, the retention element 352 can be retracted upwards, enabling the biasing element 330 to urge the inertial safety releasing deadbolt 322 upwards, thus removing the conically shaped deadbolt engaging end 324 from the doorframe deadbolt engaging feature 214.

User operation of the inertial safety releasing vehicle deadbolt assembly 300 can be provided by a remote control, a keypad, a magnetic sensor, a proximity card, a cellular transmitted command, and the like. The deadbolt seating element 360 can be operated by an electrical signal. The operational release subassembly 370 can be operated by an electrical signal. Electrical power can be provided to the inertial safety releasing vehicle deadbolt assembly 300 by the vehicle battery, an internally stored power cell, and the like, or any combination thereof.

It is well understood that the inertial safety releasing vehicle deadbolt assembly 300 can be modified by incorporating a wide variety of alternative configurations to provide the same functionality.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A vehicle security system, the system comprising:
    an inertial releasing deadbolt assembly to installed in a vehicle in an arrangement which employs a inertial safety releasing deadbolt to retain a pivotal door from opening when placed in an engaging configuration, wherein the inertial releasing deadbolt includes:
    an inertial release mechanism that drives the inertial releasing deadbolt from the engaging configuration to a released configuration automatically when the vehicle is subjected to a sudden impact, wherein the inertial release mechanism is a weighted ring pivotally assembled to an inertial safety releasing deadbolt by an inertial release mechanism support element, wherein the inertial safety releasing deadbolt passes through an aperture of the weighted ring,
    wherein the impact causes the weighted ring to strike the inertial safety releasing deadbolt resulting in a transition from the locking configuration to the released configuration.

2. A vehicle security system as recited in claim 1, further comprising a biasing element, wherein the biasing element provides a biasing force to the inertial releasing deadbolt.

3. A vehicle security system as recited in claim 1, further comprising a release controller wherein the release controller toggles the inertial releasing deadbolt from the engaging configuration to a released configuration automatically when at least one airbag is deployed, wherein the release controller transmits an electrical signal to an operational release subassembly and the operational release subassembly toggles the inertial releasing deadbolt from the engaging configuration to a released configuration.

4. A vehicle security system as recited in claim 1, the inertial releasing deadbolt further comprising a conically shaped engaging end, wherein the conically shaped engaging end is positioned to engage with a deadbolt engaging feature provided on the vehicle.

5. A vehicle security system as recited in claim 1, further comprising a deadbolt registration member having a deadbolt registration member aperture passing therethrough and concentric about a deadbolt registration member aperture central axis,
    wherein the deadbolt registration member aperture central axis is in alignment with a deadbolt retention surface of the retention element.

6. A vehicle security system as recited in claim 5, the inertial releasing deadbolt further comprising a conically shaped engaging end located proximate the deadbolt registration member; and
    wherein the deadbolt registration member aperture is formed having an inverted frustum shape.

7. A cargo vehicle security system, the system comprising:
a roll up cargo door providing a first access to a cargo enclosed area of a cargo vehicle;
a roll up cargo door automated locking assembly comprising at least one locking bar moveably assembled to the roll up cargo door proximate a cargo door vertical edge, the at least one locking bar being in operable communication with a slip linkage, wherein the slip linkage is provided between a opener linkage arm driven by an automated opening drive mechanism and a linkage arm bracket assembled to the roll up cargo door, wherein the cargo door automated locking assembly refrains the roll up cargo door from opening when the cargo door automated locking assembly is placed in a locking configuration and enables motion of the roll up cargo door when the cargo door automated locking assembly is placed in an unlocked configuration;
a pivotal door providing a second access to a cargo enclosed area of a cargo vehicle; and
an inertial releasing deadbolt assembled to the cargo vehicle in an arrangement which retains the pivotal door from opening when placed in an engaging configuration, wherein the inertial releasing deadbolt includes at least one inertial release mechanism, wherein the at least one inertial release mechanism includes a weighted element connected to a release element, wherein the release element enables the weighted element to freely move in any substantially horizontal direction with respect to a substantially horizontal plane of the vehicle, wherein when the cargo vehicle is subjected to a sudden impact, the sudden impact forces the weighted element to move in a corresponding substantially horizontal direction with respect to the substantially horizontal plane of the vehicle, and the movement of the weighted element translates a motion to the release element, which toggles the inertial releasing deadbolt from the engaging configuration to the released configuration.

8. A cargo vehicle security system as recited in claim 7, wherein the inertial release mechanism is a weighted ring pivotally assembled about the inertial releasing deadbolt.

9. A cargo vehicle security system as recited in claim 7, further comprising a biasing element, wherein the biasing element provides a biasing force to the inertial releasing deadbolt.

10. A vehicle security system as recited in claim 7, further comprising a release controller wherein the release controller toggles the inertial releasing deadbolt from the engaging configuration to the released configuration automatically when at least one airbag is deployed, wherein the release controller transmits an electrical signal to an operational release subassembly and the operational release subassembly toggles the inertial releasing deadbolt from the engaging configuration to a released configuration.

11. A cargo vehicle security system as recited in claim 7, further comprising an external release mechanism in one of direct and indirect operational communication with the roll up cargo door automated locking assembly causing the at least one locking bar to, traverse from the locking configuration to an unlocked configuration.

12. A cargo vehicle security system as recited in claim 7, the inertial releasing deadbolt further comprising a conically shaped engaging end, wherein the conically shaped engaging end is positioned to engage with a deadbolt engaging feature provided on the cargo vehicle.

13. A cargo vehicle security system as recited in claim 7, further comprising a deadbolt registration member having a deadbolt registration member aperture passing therethrough, wherein a central axis of the deadbolt registration member aperture is in registration with a central longitudinal axis of the inertial releasing deadbolt.

14. A cargo vehicle security system as recited in claim 13, the inertial releasing deadbolt further comprising a conically shaped engaging end located proximate the deadbolt registration member; and
wherein the deadbolt registration member aperture is formed having an inverted frustum shape.

15. A vehicle security system, the system comprising:
a deadbolt locking assembly assembled to a vehicle in an arrangement which retains a pivotal door from opening when placed in an engaging configuration, wherein the deadbolt locking assembly includes at least one emergency release mechanism that toggles an inertial releasing deadbolt from the engaging configuration to a released configuration,
wherein the at least one emergency release mechanism includes:
a mechanically operated manual release member accessible from an exterior of the vehicle;
and an inertial release mechanism which toggles the inertial releasing deadbolt from the engaging configuration to the released configuration automatically when the vehicle is subjected to a sudden impact, wherein the inertial release mechanism includes a weighted element connected to a release element, wherein the release element enables the weighted element to freely move in any substantially horizontal direction with respect to a substantially horizontal plane of the vehicle, wherein when the cargo vehicle is subjected to a sudden impact, the sudden impact forces the weighted element to move in a corresponding substantially horizontal direction with respect to the substantially horizontal plane of the vehicle, and the movement of the weighted element translates a motion to the release element, which toggles the inertial releasing deadbolt from the engaging configuration to the released configuration.

16. A vehicle security system as recited in claim 15, wherein the deadbolt locking assembly further comprises a deadbolt pin and the deadbolt pin is inserted between a pivoting door of the vehicle and a fixed doorframe section of the vehicle.

17. A vehicle security system as recited in claim 15, wherein the deadbolt locking assembly further comprises a deadbolt pin and the deadbolt pin is inserted between a first pivoting door of the vehicle and a second pivoting door of the vehicle.

18. A vehicle security system as recited in claim 15, the deadbolt locking assembly further comprising a remote control, wherein the remote control provides wireless operation of deadbolt locking assembly.

19. A vehicle security system as recited in claim 15, further comprising a roll up cargo door automated locking assembly including at least one locking bar moveably assembled to a roll up cargo door proximate a cargo door vertical edge, the at least one locking bar being in operable communication with at least one of an opener linkage arm and a slip linkage, wherein the cargo door automated locking assembly refrains the roll up cargo door from opening when the cargo door automated locking assembly is placed in a locking configuration and enables motion of the roll up cargo door when the cargo door automated locking assembly is placed in an unlocked configuration.

* * * * *